(12) United States Patent
Minami et al.

(10) Patent No.: US 12,467,110 B2
(45) Date of Patent: Nov. 11, 2025

(54) HIGH STRENGTH STEEL SHEET, HIGH STRENGTH COATED OR PLATED STEEL SHEET, METHODS OF PRODUCING SAME, AND MEMBER

(71) Applicant: JFE STEEL CORPORATION, Tokyo (JP)

(72) Inventors: Hidekazu Minami, Tokyo (JP); Yusuke Wada, Tokyo (JP); Yuki Toji, Tokyo (JP); Takeshi Nishiyama, Tokyo (JP); Michitoshi Saeki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 115 days.

(21) Appl. No.: 18/572,182

(22) PCT Filed: May 31, 2022

(86) PCT No.: PCT/JP2022/022198
§ 371 (c)(1),
(2) Date: Dec. 20, 2023

(87) PCT Pub. No.: WO2023/281939
PCT Pub. Date: Jan. 12, 2023

(65) Prior Publication Data
US 2024/0287637 A1     Aug. 29, 2024

(30) Foreign Application Priority Data

Jul. 9, 2021   (JP) ................................. 2021-114595

(51) Int. Cl.
*C21D 9/46*     (2006.01)
*C21D 1/18*     (2006.01)
(Continued)

(52) U.S. Cl.
CPC ................. *C21D 9/46* (2013.01); *C21D 1/18* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS

2019/0194775 A1   6/2019  Ono et al.
2020/0131597 A1*  4/2020  Takashima ............. C21D 6/007
(Continued)

FOREIGN PATENT DOCUMENTS

JP   2021025094 A   2/2021
WO   2018062380 A1  4/2018
(Continued)

OTHER PUBLICATIONS

Aug. 23, 2022, International Search Report issued in the International Patent Application No. PCT/JP2022/022198.
(Continued)

*Primary Examiner* — Xiaobei Wang
(74) *Attorney, Agent, or Firm* — KENJA IP LAW PC

(57) ABSTRACT

A high strength steel sheet with a chemical composition containing C, Si, Mn, P, S, Al, N, Nb, Ti, and B, where [% Si]/[% Mn] is 0.10 or more and 0.60 or less, and free Ti content determined from Formula (1), below, is 0.001 mass % or more, with the balance being Fe and inevitable impurity. In a steel sheet surface layer, a total amount of Nb solute and 100 nm or smaller precipitate is 0.002 mass % or more.

free Ti content (%) = [% Ti] − (47.9/14.0)×[% N] − (47.9/32.1)×[% S]     (1)

20 Claims, 2 Drawing Sheets

(51) Int. Cl.
   *C21D 6/00*   (2006.01)
   *C21D 8/02*   (2006.01)
   *C22C 38/00*  (2006.01)
   *C22C 38/02*  (2006.01)
   *C22C 38/04*  (2006.01)
   *C22C 38/06*  (2006.01)
   *C22C 38/08*  (2006.01)
   *C22C 38/10*  (2006.01)
   *C22C 38/12*  (2006.01)
   *C22C 38/14*  (2006.01)
   *C22C 38/16*  (2006.01)
   *C22C 38/26*  (2006.01)
   *C22C 38/28*  (2006.01)
   *C22C 38/32*  (2006.01)
   *C22C 38/38*  (2006.01)
   *C22C 38/60*  (2006.01)

(52) U.S. Cl.
   CPC ............ *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/26* (2013.01); *C22C 38/28* (2013.01); *C22C 38/32* (2013.01); *C22C 38/38* (2013.01); *C22C 38/60* (2013.01); *C21D 2211/001* (2013.01); *C21D 2211/005* (2013.01); *C21D 2211/008* (2013.01)

(56) References Cited

U.S. PATENT DOCUMENTS

| | | | |
|---|---|---|---|
| 2020/0172991 A1* | 6/2020 | Takashima | ................ C23C 2/40 |
| 2020/0354806 A1* | 11/2020 | Takashima | ........... C21D 8/0226 |
| 2022/0064771 A1* | 3/2022 | Yokoyama | .............. C22C 38/52 |
| 2022/0090247 A1 | 3/2022 | Yoshioka et al. | |
| 2022/0195552 A1 | 6/2022 | Minami et al. | |
| 2022/0251676 A1 | 8/2022 | Minami et al. | |
| 2023/0002848 A1* | 1/2023 | Abukawa | ............... C21D 6/002 |

FOREIGN PATENT DOCUMENTS

| | | |
|---|---|---|
| WO | 2020129403 A1 | 6/2020 |
| WO | 2020184154 A1 | 9/2020 |
| WO | 2021019947 A1 | 2/2021 |

OTHER PUBLICATIONS

Oct. 8, 2024, the Extended European Search Report issued by the European Patent Office in the corresponding European Patent Application No. 22837360.1.

* cited by examiner

HIGH STRENGTH STEEL SHEET, HIGH STRENGTH COATED OR PLATED STEEL SHEET, METHODS OF PRODUCING SAME, AND MEMBER

TECHNICAL FIELD

The present disclosure relates to a high strength steel sheet, a high strength coated or plated steel sheet, methods of producing same, and a member.

BACKGROUND

Higher strength thin steel sheets for automobiles are being developed to both reduce $CO_2$ emissions by reducing vehicle weight and improve crashworthiness by reducing automotive body weight, and new regulations are also being introduced one after another. Accordingly, in order to increase automotive body strength, high strength steel sheets having a tensile strength (TS) of 1180 MPa or more are increasingly being used in major structural components forming the framework of automobile cabins.

High strength steel sheets used for automobile reinforcing components and frame structural components need to have excellent formability. Further, components after forming are required to have excellent dimensional accuracy. For example, components such as crash boxes have punched end surfaces and bent portions, and therefore steel sheets having high stretch flangeability and bendability are suitable from the viewpoint of formability. Further, in view of component performance, an increase in impact absorption energy in the event of a collision is achieved by increasing the yield ratio (YR=yield stress YS/tensile strength TS) of steel sheets. Further, in view of component dimensional accuracy, controlling the yield ratio (YR) of steel sheets within a certain range inhibits springback after steel sheet forming and allow control of the component dimensional accuracy. To increase the applicability of high strength steel sheets to automotive parts, there is a demand for comprehensive satisfaction of these property requirements.

More recently, it has been confirmed that when high strength galvanized steel sheets are spot welded, zinc in the coated or plated layer diffusely penetrates into yield crystal grain boundaries of a steel sheet surface layer, causing liquid metal embrittlement (LME) and intergranular cracking (LME cracking). LME cracking may occur in high strength steel sheets without a galvanized layer when a welding partner is a galvanized steel sheet, and is therefore becoming a problem for all high strength steel sheets. Therefore, when applying high strength steel sheets to framework components, there is a demand for high strength steel sheets having excellent LME resistance.

In response to these demands, for example, Patent Literature (PTL) 1 provides a high strength steel sheet having excellent ductility, stretch flangeability, bendability, and LME resistance, and a tensile strength of 980 MPa or more that may be used to produce components having high dimensional accuracy.

CITATION LIST

Patent Literature

PTL 1: WO 2020/184154 A1

SUMMARY

Technical Problem

The high strength steel sheet described in PTL 1 may be used to produce components having high dimensional accuracy while also comprehensively satisfying strength, ductility, stretch flangeability, bendability, and LME resistance requirements. However, the high strength steel sheet described in PTL 1 has a TS of 980 MPa, leaving room for further improvement in strength.

It would be helpful to provide a high strength steel sheet having excellent stretch flangeability, bendability, and LME resistance, and a TS of 1180 MPa or more that may be used to produce components having high dimensional accuracy, and to provide an advantageous method of producing the high strength steel sheet.

In the present disclosure, an ability to produce components having high dimensional accuracy (high dimensional accuracy during forming) means that the yield ratio (YR) is 65% or more and 90% or less. YR is obtained by the following Formula (2).

$$YR = YS/TS \times 100 \qquad (2)$$

Excellent stretch flangeability is defined as a hole expansion ratio (2) value of 25% or more as an index of stretch flangeability.

Bendability is evaluated by a pass rate of a bend test. Where R is bend radius and t is sheet thickness, five samples are subjected to the bend test at a maximum value of R where R/t is 5 or less, and then cracking at a ridge of the tip of each sample is evaluated. Only when all five samples do not crack, that is, when the pass rate is 100%, is bendability judged to be excellent.

Further, for LME resistance, a fracture portion of a test piece after a high-temperature tensile test described under the EXAMPLES section is cut so that a sheet thickness section (L section) parallel to the tensile direction of the test piece becomes the observation plane. The sheet thickness section is then observed to determine a sheet thickness t at a position 400 μm from a lead end of the tensile fracture. When a thickness reduction quantity obtained by substituting the sheet thickness t into the following Formula (3) is 0.20 or more, LME resistance is judged to be excellent.

$$\text{Thickness reduction} = (t_0 - t)/t_0 \qquad (3)$$

Here, $t_0$ is initial sheet thickness of the notched tensile test piece before the high temperature tensile test, and t is the sheet thickness at a position 400 μm from the lead end of the tensile fracture toward a grip portion after the high temperature tensile test. For example, in the L section of the fracture portion illustrated in FIG. 1, t is determined as illustrated.

When the value of the thickness reduction is large, that is, when fracturing occurred after a large constriction during a high temperature tensile test, LME resistance is judged to be excellent.

Solution to Problem

As a result of intensive studies, the inventors made the following discoveries.

(1) By making the microstructure mainly martensite (quenched martensite and tempered martensite), stretch flangeability of 25% or more is achievable.

(2) By making the average value of a ratio of grain size in the rolling direction to grain size in the thickness direction of prior austenite grains be 2.0 or less, YR, an index of component dimensional accuracy, of 65% or more and 90% or less is achievable.

(3) By making [% Si]/[% Mn] be 0.10 or more and 0.60 or less, and making a hardness variation frequency be 20 or less per 1500 μm in the sheet transverse direction at a 200 μm sheet thickness position, good bendability is achievable.

(4) By making [% Si]/[% Mn] be 0.10 or more and 0.60 or less, and, in a sheet thickness surface layer, making a total amount of Nb solute and 100 nm or smaller precipitate be 0.0020% or more, good LME resistance is achievable.

The present disclosure is based on the aforementioned discoveries. Primary features of the present disclosure are as follows.

[1] A high strength steel sheet comprising a chemical composition containing (consisting of), in mass %,
C: 0.090% or more and 0.390% or less,
Si: 0.01% or more and 2.50% or less,
Mn: 2.00% or more and 4.00% or less,
P: 0.100% or less,
S: 0.0200% or less,
Al: 0.100% or less,
N: 0.0100% or less,
Nb: 0.002% or more and 0.100% or less,
Ti: 0.005% or more and 0.100% or less, and
B: 0.0002% or more and 0.0100% or less, wherein
[% Si]/[% Mn] is 0.10 or more and 0.60 or less, and
free Ti content determined from Formula (1), below, is 0.001 mass % or more,
with the balance being Fe and inevitable impurity, wherein
in a steel sheet surface layer, a total amount of Nb solute and 100 nm or smaller precipitate is 0.002 mass % or more,
the steel microstructure at a ¼ sheet thickness position comprising:
area ratio of martensite: 78% or more,
area ratio of ferrite: 10% or less,
volume fraction of retained austenite: less than 10.0%, wherein
an average value of a ratio of grain size in the rolling direction to grain size in the thickness direction of prior austenite grains is 2.0 or less,
hardness variation frequency is 20 or less per 1500 μm in the sheet transverse direction at a 200 μm sheet thickness position, and
tensile strength is 1180 MPa or more, $$\text{free Ti content (\%)} = [\% \text{ Ti}] - (47.9/14.0) \times [\% \text{ N}] - (47.9/32.1) \times [\% \text{ S}] \quad (1)$$

where [% X] in Formula (1) represents content of element X in the steel in mass %, and is 0 when not present.

[2] The high strength steel sheet according to aspect [1], the steel microstructure further comprising a surface layer softening thickness of 10 μm or more and 100 μm or less.

[3] The high strength steel sheet according to aspect [1] or [2], the chemical composition further containing, in mass %, at least one element selected from the group consisting of:
O: 0.0100% or less,
V: 0.200% or less,
Ta: 0.10% or less,
W: 0.10% or less,
Cr: 1.00% or less,
Mo: 1.00% or less,
Ni: 1.00% or less,
Co: 0.010% or less,
Cu: 1.00% or less,
Sn: 0.200% or less,
Sb: 0.200% or less,
Ca: 0.0100% or less,
Mg: 0.0100% or less,
REM: 0.0100% or less,
Zr: 0.100% or less,
Te: 0.100% or less,
Hf: 0.10% or less, and
Bi: 0.200% or less.

[4] A high strength coated or plated steel sheet comprising the high strength steel sheet according to any one of aspects [1] to [3], and a coated or plated layer on at least one side thereof.

[5] A method of producing a high strength steel sheet comprising:
holding a steel slab having the chemical composition according to aspect [1] or [3] at a slab heating temperature of 1150° C. or more for 100 min or more;
hot rolling the steel slab under a set of conditions including a rough rolling finish temperature of 1050° C. or more and a finish rolling start temperature of 1000° C. or more, to obtain a hot-rolled sheet;
pickling the hot-rolled sheet;
cold rolling the hot-rolled sheet to a cumulative rolling reduction ratio of 20% or more and 75% or less, to obtain a cold-rolled sheet; and
annealing the cold-rolled sheet by heating the cold-rolled sheet to a heating temperature of 820° C. or more under a set of conditions including an average heating rate of 10° C./s or more in a temperature range from 250° C. or more to 700° C. or less and a time of 40 s or more from 750° C. to the heating temperature, then cooling to 150° C. or less at an average cooling rate of 1.0° C./s or more in a temperature range from 250° C. or more to 400° C. or less, to obtain the high strength steel sheet.

[6] The method of producing a high strength steel sheet according to aspect [5], wherein oxygen concentration of the atmosphere at the heating temperature is 2 volume ppm or more and 30 volume ppm or less and the dew point of the atmosphere is −35° C. or more.

[7] A method of producing a high strength coated or plated steel sheet comprising, after the annealing according to aspect [5] or [6], coating or plating by applying a coating or plating treatment to at least one side of the high strength steel sheet to obtain the high strength coated or plated steel sheet.

[8] A member comprising at least a portion of the high strength steel sheet according to any one of aspects [1] to [3].

[9] A member comprising at least a portion of the high strength coated or plated steel sheet according to aspect [4].

[10] The member according to aspect [8] or [9], wherein the member is for an automobile frame structural component or for an automobile reinforcing component.

Advantageous Effect

The present disclosure provides a high strength steel sheet and a member having excellent stretch flangeability, bendability, and LME resistance, and a TS of 1180 MPa or more that may be used to produce components having high dimensional accuracy.

DETAILED DESCRIPTION

Figure 1:
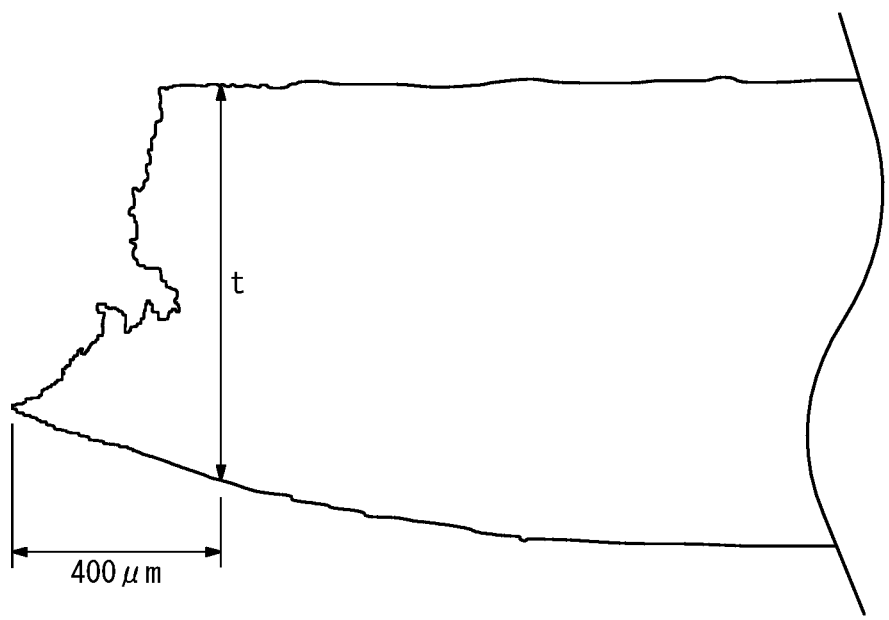
FIG. 1 is a schematic diagram for explaining measurement of thickness reduction quantity.

Embodiments of the present disclosure are described below. However, the present disclosure is not limited to the following embodiments.

First, appropriate ranges for a chemical composition of a steel sheet and reasons for such limitations are described. In the following description, "%" representing the content of a component element in a steel sheet means "mass %" unless otherwise specified. Unless otherwise specified, "ppm" means "mass ppm". As used herein, a numerical range expressed by using "to" means a range including numerical values described before and after "to" as the lower limit value and the upper limit value.

[C: 0.090% or More and 0.390% or Less]

C is one of the important basic components of steel and is particularly important in the present disclosure as an element that affects the area ratio of martensite and ferrite and the volume fraction of retained austenite. When C content is less than 0.090%, the area ratio of martensite decreases and the area ratio of ferrite further increases, making a TS of 1180 MPa or more difficult to achieve. On the other hand, when the C content exceeds 0.390%, carbon concentration in retained austenite increases excessively and hardness of martensite formed from the retained austenite during blanking increases greatly. As a result, crack propagation during hole expansion is promoted and λ is reduced. Further, bendability also decreases. The C content is therefore 0.090% or more and 0.390% or less. The C content is preferably 0.100% or more. The C content is preferably 0.360% or less. The C content is more preferably 0.110% or more. The C content is more preferably 0.350% or less.

[Si: 0.01% or More and 2.50% or Less]

Si is one of the important basic components of steel and is particularly important in the present disclosure as an element that affects the volume fraction of retained austenite due to inhibiting carbide formation during annealing and promoting formation of retained austenite. Further, Si is an element that affects the hardness variation frequency per 1500 μm in the sheet transverse direction at the 200 μm sheet thickness position, due to exhibiting a large temper softening resistance at 400° C. or less. Si content of less than 0.01% causes non-uniform hardness distribution of martensite in the sheet transverse direction, resulting in a hardness variation frequency exceeding 20 per 1500 μm in the sheet transverse direction at the 200 μm sheet thickness position, which reduces bendability. On the other hand, when the Si content exceeds 2.50%, carbon concentration in retained austenite increases excessively and the hardness of martensite that transforms from retained austenite during blanking increases significantly, resulting in increased void formation during blanking and hole expansion, which reduces λ. Further, bendability also decreases. Further, LME resistance also decreases. The Si content is therefore 0.01% or more and 2.50% or less. The Si content is preferably 0.10% or more. The Si content is preferably 2.00% or less. The Si content is more preferably 0.15% or more. The Si content is more preferably 1.50% or less.

[Mn: 2.00% or More and 4.00% or Less]

Mn is one of the important basic components of steel and is particularly important in the present disclosure as an element that affects the area ratio of martensite. When Mn content is less than 2.00%, the area ratio of martensite decreases and the area ratio of ferrite further increases, making a TS of 1180 MPa or more difficult to achieve. On the other hand, when the Mn content exceeds 4.00%, the hardness distribution of martensite in the sheet transverse direction becomes non-uniform, resulting in a hardness variation frequency exceeding 20 per 1500 μm in the sheet transverse direction at the 200 μm sheet thickness position, which reduces bendability. The Mn content is therefore 2.00% or more and 4.00% or less. The Mn content is preferably 2.20% or more. The Mn content is preferably 3.80% or less. The Mn content is more preferably 2.50% or more. The Mn content is more preferably 3.60% or less.

[P: 0.100% or Less]

Excessive P segregates at prior austenite grain boundaries, embrittling grain boundaries and reducing steel sheet ultimate deformability, resulting in a decrease in λ. Further, bendability also decreases. P content therefore needs to be 0.100% or less. A lower limit of the P content is not particularly specified. P is a solid-solution-strengthening element able to increase steel sheet strength, and therefore the P content is preferably 0.001% or more. The P content is therefore 0.100% or less. The P content is preferably 0.001% or more. The P content is preferably 0.070% or less.

[S: 0.0200% or Less]

S exists as a sulfide and reduces ultimate deformability of steel, resulting in a decrease in λ. Further, bendability also decreases. S content therefore needs to be 0.0200% or less. A lower limit of the S content is not particularly specified. In view of production technology constraints, the S content is preferably 0.0001% or more. The S content is therefore 0.0200% or less. The S content is preferably 0.0001% or more. The S content is preferably 0.0050% or less.

[Al: 0.100% or Less]

Excessive Al increases the A3 transformation temperature and causes a large amount of ferrite to be included in the microstructure, making a desired YR difficult to achieve. Al content therefore needs to be 0.100% or less. A lower limit of the Al content is not particularly specified. To inhibit carbide formation during continuous annealing and to promote formation of retained austenite, the Al content is preferably 0.001% or more. The Al content is therefore 0.100% or less. The Al content is preferably 0.001% or more. The Al content is preferably 0.050% or less.

[N: 0.0100% or Less]

N exists as a nitride and reduces steel sheet ultimate deformability, resulting in a decrease in λ. Further, bendability also decreases. N content therefore needs to be 0.0100% or less. A lower limit of the N content is not particularly specified. In view of production technology constraints, the N content is preferably 0.0005% or more. The N content is therefore 0.0100% or less. The N content is preferably 0.0005% or more. The N content is preferably 0.0050% or less.

[Nb: 0.002% or More and 0.100% or Less]

Nb increases steel sheet strength by forming fine carbides, nitrides, and carbonitrides during hot rolling and annealing. Further, addition of Nb increases the total amount of Nb solute and 100 nm or smaller precipitates in the sheet thickness surface layer, and enables achieving good LME resistance. To obtain these effects, Nb content needs to be 0.002% or more. On the other hand, when the Nb content exceeds 0.100%, carbides, nitrides, and carbonitrides become coarse and increase in quantity, resulting in reduced bendability. The Nb content is therefore 0.002% or more and 0.100% or less. The Nb content is preferably 0.003% or more. The Nb content is preferably 0.060% or less. The Nb content is more preferably 0.004% or more. The Nb content is more preferably 0.030% or less.

[Ti: 0.005% or More and 0.100% or Less]

Ti increases steel sheet strength by forming fine carbides, nitrides, and carbonitrides during hot rolling and annealing. Further, addition of Ti increases the total amount of Nb solute and 100 nm or smaller Nb precipitates in the sheet thickness surface layer, and enables achieving good LME resistance. To obtain these effects, Ti content needs to be 0.005% or more. On the other hand, when the Ti content exceeds 0.100%, carbides, nitrides, and carbonitrides become coarse and increase in quantity, resulting in reduced bendability. The Ti content is therefore 0.005% or more and 0.100% or less. The Ti content is preferably 0.008% or more. The Ti content is preferably 0.060% or less. The Ti content is more preferably 0.010% or more. The Ti content is more preferably 0.030% or less.

[B: 0.0002% or More and 0.0100% or Less]

B is an element able to improve hardenability without lowering martensitic transformation initiation temperature, and is able to inhibit formation of ferrite in a cooling process during annealing. To obtain these effects, B content needs to be 0.0002% or more. On the other hand, when the B content exceeds 0.0100%, cracking may occur inside a steel sheet during hot rolling, reducing steel sheet ultimate deformability, reducing 2. Further, bendability also decreases. Therefore, when B is added, the content is 0.0002% or more and 0.0100% or less. The B content is preferably 0.0003% or more. The B content is preferably 0.0050% or less. The B content is more preferably 0.0004% or more. The B content is more preferably 0.0040% or less.

[[% Si]/[% Mn]: 0.10 or More and 0.60 or Less]

In the present disclosure, this is a very important component. By controlling [% Si]/[% Mn] to the desired range, good bendability and LME resistance are achievable. [% Si]/[% Mn] of less than 0.10 causes non-uniform hardness distribution of martensite in the sheet transverse direction, resulting in a hardness variation frequency exceeding 20 per 1500 μm in the sheet transverse direction at the 200 μm sheet thickness position, which reduces bendability. On the other hand, when [% Si]/[% Mn] exceeds 0.60, LME resistance decreases. [% Si]/[% Mn] is therefore 0.10 or more and 0.60 or less. [% Si]/[% Mn] is preferably 0.12 or more. [% Si]/[% Mn] is preferably 0.50 or less. [% Si]/[% Mn] is more preferably 0.13 or more. [% Si]/[% Mn] is more preferably 0.40 or less.

$$[\text{Free Ti content (\%)} = [\% \text{ Ti}] - \quad (1)$$
$$(47.9/14.0) \times [\% \text{ N}] - (47.9/32.1) \times [\% \text{ S}]: 0.001\% \text{ or more}]$$

Setting free Ti content determined by Formula (1), above, to at least a certain value increases the total amount of Nb solute and 100 nm or smaller precipitates in the sheet thickness surface layer, and enables achieving good LME resistance. To achieve these effects, the free Ti content needs to be 0.001% or more. An upper limit of the free Ti content is not particularly specified. Excess free Ti content causes carbides, nitrides, and carbonitrides to become coarse and increase in quantity, resulting in a decrease in bendability, and therefore the free Ti content is preferably 0.040% or less. The free Ti content is therefore 0.001% or more. The free Ti content is preferably 0.002% or more. The free Ti content is preferably 0.040% or less.

The high strength steel sheet according to an embodiment of the present disclosure has a chemical composition that contains the above elements, with the balance being Fe and inevitable impurity. The high strength steel sheet according to a preferred embodiment of the present disclosure has a chemical composition that consists of the above elements, with the balance being Fe and inevitable impurity. Here, examples of inevitable impurity include Zn, Pb, and As. Such impurities are allowed to be included as long as a total amount is 0.100% or less.

In addition to the essential components described above, the chemical composition of the high strength steel sheet according to the present disclosure may further contain, in mass %, at least one element, alone or in combination, selected from the group consisting of: O: 0.0100% or less, V: 0.200% or less, Ta: 0.10% or less, W: 0.10% or less, Cr: 1.00% or less, Mo: 1.00% or less, Ni: 1.00% or less, Co: 0.010% or less, Cu: 1.00% or less, Sn: 0.200% or less, Sb: 0.200% or less, Ca: 0.0100% or less, Mg: 0.0100% or less, REM: 0.0100% or less, Zr: 0.100% or less, Te: 0.100% or less, Hf: 0.10% or less, and Bi: 0.200% or less.

[O: 0.0100% or Less]

O exists as an oxide and reduces steel sheet ultimate deformability, and therefore O content exceeding 0.0100% reduces A. Further, bendability also decreases. The O content is therefore 0.0100% or less. A lower limit of the O content is not particularly specified. In view of production technology constraints, the O content is preferably 0.0001% or more. Therefore, when added, the O content is 0.0100% or less. The O content is preferably 0.0001% or more. The O content is preferably 0.0050% or less.

[V: 0.200% or Less]

V generates a large amount of coarse precipitates and inclusions and reduces steel sheet ultimate deformability, and therefore V content exceeding 0.200% reduces λ. Further, bendability also decreases. The V content is therefore 0.200% or less. A lower limit of the V content is not particularly specified. A V content of 0.001% or more increases steel sheet strength by forming fine carbides, nitrides, and carbonitrides during hot rolling or continuous annealing. Further, the addition of V increases recrystallization temperature in heating during annealing and decreases an average value of the ratio of grain size in the rolling direction to grain size in the thickness direction of prior austenite grains, thereby controlling YR to the desired range. Therefore, the V content is preferably 0.001% or more. Therefore, when added, the V content is 0.200% or less. The V content is preferably 0.001% or more. The V content is preferably 0.100% or less.

[Ta: 0.10% or Less]
[W: 0.10% or Less]

When the content of either or both of Ta and W exceeds 0.10%, large amounts of coarse precipitates and inclusions are formed, which reduces steel sheet ultimate deformability, resulting in lower. Further, bendability also decreases. Therefore, the content of each of Ta and W is respectively 0.10% or less. Lower limits of Ta and W content are not particularly specified. Ta and W content increases steel sheet strength by forming fine carbides, nitrides, and carbonitrides during hot rolling or continuous annealing, and therefore the content of each of Ta and W is respectively preferably 0.01% or more. Therefore, when added, the content of each of Ta and W is respectively 0.10% or less. The content of each of Ta and W is respectively preferably 0.01% or more. The content of each of Ta and W is respectively preferably 0.08% or less.

[Cr: 1.00% or Less]
[Mo: 1.00% or Less]
[Ni: 1.00% or Less]

When any of Cr, Mo, or Ni exceed 1.00%, coarse precipitates and inclusions increase and steel sheet ultimate deformability is reduced, resulting in lower $\lambda$. Further, bendability also decreases. The content of each of Cr, Mo, and Ni is therefore respectively 1.00% or less. Lower limits of Cr, Mo, and Ni content are not particularly specified. Cr, Mo, and Ni are elements that improve hardenability, and therefore the content of each of Cr, Mo, and Ni is respectively preferably 0.01% or more. Therefore, when added, the content of each of Cr, Mo, and Ni is respectively 1.00% or less. The content of each of Cr, Mo, and Ni is respectively preferably 0.01% or more. The content of each of Cr, Mo, and Ni is respectively preferably 0.80% or less.

[Co: 0.010% or Less]

When Co content exceeds 0.010%, coarse precipitates and inclusions increase and steel sheet ultimate deformability is reduced, resulting in lower $\lambda$. Further, bendability also decreases. The Co content is therefore 0.010% or less. A lower limit of the Co content is not particularly specified. Co is an element that improves hardenability, and therefore the Co content is preferably 0.001% or more. Therefore, when added, the Co content is 0.010% or less. The Co content is preferably 0.001% or more. The Co content is preferably 0.008% or less.

[Cu: 1.00% or Less]

When Cu content exceeds 1.00%, coarse precipitates and inclusions increase and steel sheet ultimate deformability is reduced, resulting in lower A. Further, bendability also decreases. The Cu content is therefore 1.00% or less. A lower limit of the Cu content is not particularly specified. Cu is an element that improves hardenability, and therefore the Cu content is preferably 0.01% or more. Therefore, when added, the Cu content is 1.00% or less. The Cu content is preferably 0.01% or more. The Cu content is preferably 0.80% or less.

[Sn: 0.200% or Less]

When Sn content exceeds 0.200%, cracks are formed inside the steel sheet during casting or hot rolling, and steel sheet ultimate deformability is reduced, resulting in lower $\lambda$. Further, bendability also decreases. The Sn content is therefore 0.200% or less. A lower limit of the Sn content is not particularly specified. Sn is an element that improves hardenability, and therefore the Sn content is preferably 0.001% or more. Therefore, when added, the Sn content is 0.200% or less. The Sn content is preferably 0.001% or more. The Sn content is preferably 0.100% or less.

[Sb: 0.200% or Less]

When Sb content exceeds 0.200%, coarse precipitates and inclusions increase and steel sheet ultimate deformability is reduced, resulting in lower $\lambda$. Further, bendability also decreases. The Sb content is therefore 0.200% or less. A lower limit of the Sb content is not particularly specified. Sb is an element that controls surface layer softening thickness and enables strength adjustment, and therefore the Sb content is preferably 0.001% or more. Therefore, when added, the Sb content is 0.200% or less. The Sb content is preferably 0.001% or more. The Sb content is preferably 0.100% or less.

[Ca: 0.0100% or Less]
[Mg: 0.0100% or Less]
[REM: 0.0100% or Less]

When the content of any of Ca, Mg, or REM exceeds 0.0100%, coarse precipitates and inclusions increase and steel sheet ultimate deformability is reduced, resulting in lower $\lambda$. Further, bendability also decreases. Therefore, the content of each of Ca, Mg, and REM is respectively 0.0100% or less. Lower limits of Ca, Mg, and REM content are not particularly specified. Ca, Mg, and REM are elements that spheroidize the shape of nitrides and sulfides and improve steel sheet ultimate deformability, and therefore the content of each of Ca, Mg, and REM is respectively preferably 0.0005% or more. Therefore, when added, the content of each of Ca, Mg, and REM is respectively 0.0100% or less. The content of each of Ca, Mg, and REM is respectively preferably 0.0005% or more. The content of each of Ca, Mg, and REM is respectively preferably 0.0050% or less.

[Zr: 0.100% or Less]
[Te: 0.100% or Less]

When either or both of Zr and Te exceed 0.100%, coarse precipitates and inclusions increase and steel sheet ultimate deformability is reduced, resulting in lower $\lambda$. Further, bendability also decreases. The content of each of Zr and Te is therefore respectively 0.100% or less. Lower limits of Zr and Te content are not particularly specified. Zr and Te are elements that spheroidize the shape of nitrides and sulfides and improve steel sheet ultimate deformability, and therefore the content of each of Zr and Te is respectively preferably 0.001% or more. Therefore, when added, the content of each of Zr and Te is 0.100% or less. The content of each of Zr and Te is respectively preferably 0.001% or more. The content of each of Zr and Te is respectively preferably 0.080% or less.

[Hf: 0.10% or Less]

When Hf content exceeds 0.10%, coarse precipitates and inclusions increase and steel sheet ultimate deformability is reduced, resulting in lower $\lambda$. Further, bendability also decreases. The Hf content is therefore 0.10% or less. A lower limit of the Hf content is not particularly specified. Hf is an element that spheroidizes the shape of nitrides and sulfides and improves steel sheet ultimate deformability, and therefore the Hf content is preferably 0.01% or more. Therefore, when added, the Hf content is 0.10% or less. The Hf content is preferably 0.01% or more. The Hf content is preferably 0.08% or less.

[Bi: 0.200% or Less]

When Bi content exceeds 0.200%, coarse precipitates and inclusions increase and steel sheet ultimate deformability is reduced, resulting in lower $\lambda$. Further, bendability also decreases. The Bi content is therefore 0.200% or less. A lower limit of the Bi content is not particularly specified. Bi is an element that reduces segregation, and therefore the Bi content is preferably 0.001% or more. Therefore, when added, the Bi content is 0.200% or less. The Bi content is preferably 0.001% or more. The Bi content is preferably 0.100% or less.

When the content of each of O, V, Ta, W, Cr, Mo, Ni, Co, Cu, Sn, Sb, Ca, Mg, REM, Zr, Te, Hf, and Bi described above is less than the respective preferred lower limit, the effect of the present disclosure is not harmed, and therefore these elements are included as inevitable impurity.

Next, the microstructure of the steel sheet is described.

[Area Ratio of Martensite: 78% or More]

By making martensite the main phase, a TS of 1180 MPa or more is achievable. To achieve this effect, the area ratio of martensite is 78% or more. Although the effect of the present disclosure is obtainable even when the area ratio of martensite is 100%, in order to improve ductility, the area ratio is preferably 99% or less. The area ratio of martensite is therefore 78% or more. The area ratio of martensite is preferably 79% or more. The area ratio of martensite is preferably 99% or less. The area ratio of martensite is more preferably 80% or more. The area ratio of martensite is more preferably 98% or less. The area ratio of martensite is even more preferably 82% or more. The area ratio of martensite is even more preferably 97% or less. Martensite may also be defined as quenched martensite, tempered martensite, and bainite. The observation position of the area ratio of martensite is a ¼ sheet thickness position of the steel sheet, as described below.

[Area Ratio of Ferrite: 10% or Less]

By making the area ratio of ferrite 10% or less, TS and YR are controllable within the desired ranges. Further, $\lambda$ and bendability may be improved. Although the effect of the present disclosure is obtainable even when the area ratio of ferrite is 0%, in order to improve ductility, the area ratio of ferrite is preferably 1% or more. The area ratio of ferrite is therefore 10% or less. The area ratio of ferrite is preferably 1% or more. The area ratio of ferrite is preferably 8% or less. The area ratio of ferrite is preferably 2% or more. Ferrite may also be defined as bainitic ferrite. The observation position of the area ratio of ferrite is the ¼ sheet thickness position of the steel sheet, as described below.

The area ratios of martensite (including quenched martensite, tempered martensite, and bainite) and ferrite (including bainitic ferrite) are measured as follows.

A test sample is cut so that the observation plane is a sheet thickness cross section (L section) parallel to the rolling direction of the steel sheet. The observation plane is then mirror polished using diamond paste, followed by finish polishing using colloidal silica, and then etching with 3 vol % nital to reveal the microstructure. Under a condition of 1 kV accelerating voltage, three views of 17 µm×23 µm fields of view are observed at a magnification of 5000× using a scanning electron microscope (SEM) equipped with an in-lens detector, with a ¼ sheet thickness position of the steel sheet as the observation position. Using Adobe Photoshop by Adobe Systems Inc., the area of each component microstructure (ferrite (including bainitic ferrite) and martensite (including tempered martensite, bainite, and quenched martensite)) divided by the measured area of the obtained microstructure image is calculated as an area ratio for each of the three fields of view, and these values are averaged to obtain the area ratio of each microstructure. Further, in the microstructure images, ferrite (including bainitic ferrite) is a concave microstructure that is smooth and contains no carbides, tempered martensite and bainite are concave microstructures that contain fine carbides, and quenched martensite is a convex microstructure that has fine irregularities in the interior, and are therefore distinguishable from each other. Tempered martensite, quenched martensite, and bainite need not be distinguishable from each other, as the total area ratio is determined as the area ratio of martensite.

[Volume Fraction of Retained Austenite: Less than 10.0%]

When the volume fraction of retained austenite is 10.0% or more, achieving the desired YR becomes difficult. Further, an amount of martensite that transforms from retained austenite during blanking increases, resulting in increased void formation during blanking and hole expansion, which reduces $\lambda$. The volume fraction of retained austenite is therefore less than 10.0%. The volume fraction of retained austenite is preferably 0.5% or more. The volume fraction of retained austenite is preferably 8.0% or less. The volume fraction of retained austenite is more preferably 1.0% or more. The volume fraction of retained austenite is more preferably 6.0% or less.

Here, the volume fraction of retained austenite is measured as follows. A steel sheet surface layer is ground so that the observation plane is the ¼ sheet thickness position (the position corresponding to ¼ of the sheet thickness in the depth direction from the surface of the steel sheet), and then further 0.1 mm polished by chemical polishing. Then, the integrated reflection intensities of the (200), (220), and (311) planes of fcc iron (austenite) and the (200), (211), and (220) planes of bcc iron are measured on the observation plane using an X-ray diffraction device with a Co Kα source. The volume fraction of austenite is determined from the intensity ratio of the integrated reflection intensity from each plane of fcc iron (austenite) to the integrated reflection intensity from each plane of bcc iron, and this is taken as the volume fraction of retained austenite.

[Average Value of Ratio of Grain Size in Rolling Direction to Grain Size in Thickness Direction of Prior Austenite Grains: 2.0 or Less]

In the present disclosure, this is a very important component. YR is controllable in the desired range by decreasing the average value of the ratio of the grain size in the rolling direction to the grain size in the thickness direction of prior austenite grains, that is, by making the prior austenite grains a shape close to equiaxed. To achieve this effect, the average value of the ratio of the grain size in the rolling direction to the grain size in the thickness direction of prior austenite grains needs to be 2.0 or less. A lower limit of the ratio of the grain size in the rolling direction to the grain size in the thickness direction of prior austenite grains is not particularly limited. In order to control YR to the desired range, the ratio is preferably 0.5 or more. The average value of the ratio of the grain size in the rolling direction to the grain size in the thickness direction of prior austenite grains is therefore 2.0 or less. The average value of the ratio of the grain size in the rolling direction to the grain size in the thickness direction of prior austenite grains is preferably 0.5 or more. The average value of the ratio of the grain size in the rolling direction to the grain size in the thickness direction of prior austenite grains is preferably 1.9 or less.

Here, the average value of the ratio of the grain size in the rolling direction to the grain size in the thickness direction of prior austenite grains is measured as follows. After heat treatment at 600° C. for 10 min, a test sample of the steel sheet is cut out so that a sheet thickness cross section parallel to the rolling direction of the steel sheet becomes the observation plane. The observation plane is then mirror polished with diamond paste. The observation plane is then further etched with a corrosive solution consisting of a saturated picric acid solution plus sulfonic acid, oxalic acid, and ferrous chloride to reveal prior austenite grain boundaries. Using an optical microscope, microstructure images are obtained by observing three views of the observation plane in 169 μm×225 μm fields of view at 400× magnification. Using Adobe Photoshop by Adobe Systems, Inc., the obtained microstructure images are used to calculate the ratio of the grain size in the rolling direction to the grain size in the thickness direction of prior austenite grains for each of three views, and the average value of these values is obtained and taken as the average value of the ratio of the grain size in the rolling direction to the grain size in the thickness direction of prior austenite grains (aspect ratio).

[Total Amount of Nb Solute and 100 nm or Smaller Precipitate in Sheet Thickness Surface Layer: 0.002 Mass % or More]

In the present disclosure, this is a very important component. After annealing, Nb that is a solute and Nb precipitated with a size of 100 nm or smaller dissolve to a solid solution state during heating in the LME test. That is, by increasing the total amount of Nb solute and 100 nm or smaller Nb precipitates in the sheet thickness surface layer, the Nb solute in the sheet thickness surface layer may be increased in the heating during the LME test. As a result, Nb segregates at grain boundaries of austenite formed in the heating during the LME test and inhibits penetration of Zn into the steel sheet, thereby achieving good LME resistance. To achieve these effects, the total amount of Nb solute and 100 nm or smaller precipitate in the sheet thickness surface layer needs to be 0.002% or more. An upper limit of the total amount of Nb solute and 100 nm or smaller precipitate in the sheet thickness surface layer is not particularly specified and may be the Nb content or less. The total amount of Nb solute and 100 nm or smaller precipitate in the sheet thickness surface layer is therefore 0.002% or more. The total amount of Nb solute and 100 nm or smaller precipitate in the sheet thickness surface layer is preferably 0.003% or more. The total amount of Nb solute and 100 nm or smaller precipitate in the sheet thickness surface layer is preferably the Nb content or less.

Here, the method for measuring the total amount of Nb solute and 100 nm or smaller Nb precipitate in the sheet thickness surface layer is as follows. In order for the steel sheet surface to be the analysis surface, test sample preparation is only to remove surface contamination, that is, the test sample is prepared without surface polishing. After electrolytic extraction of the test sample with 10% acetylacetone as electrolyte, the electrolyte is collected and analyzed for the amount of Nb solute and precipitate by the method for determination of solute components in microalloyed steel described in Reference Literature 1. After electrolyzing the test sample in a non-aqueous electrolyte solution for a certain period of time, the electrolyte is collected and used as a sample for solute component analysis. Further, the test sample after electrolytic extraction is removed from the electrolyte and transferred to a beaker containing methanol and subject to ultrasonic agitation. After agitation, the methanol is filtered through filter paper having a pore size of 100 nm, and the filtrate is used as a sample for precipitate analysis containing 100 nm or smaller precipitates. The amount of Nb solute is determined by inductively coupled plasma (ICP) emission spectrometry on the sample for solute component analysis. Further, for the sample for precipitate analysis, after drying the filtrate, nitric acid, perchloric acid, and sulfuric acid are added and heated to dissolve until sulfuric acid white smoke is produced. After being allowed to naturally cool, hydrochloric acid is added and the solution is diluted to a certain amount with pure water to prepare a solution, and the amount of 100 nm or smaller Nb precipitate is determined by ICP emission spectrometry. In the case of a coated or plated steel sheet, the above analysis is performed after alkali removal of the hot dip galvanized layer of the test sample.

[Reference Literature 1] Satoshi Kinoshiro, Tomoharu Ishida, Masao Inose, Kyoko Fujimoto: Tetsu-to-Hagane, 99 (2013), 362.

[Hardness Variation Frequency Per 1500 μm in Sheet Transverse Direction at 200 μm Sheet Thickness Position: 20 or Less]

In the present disclosure, this is a very important component. The desired bendability is achievable by reducing hardness variation frequency per 1500 μm in the sheet transverse direction at the 200 μm sheet thickness position from the steel sheet surface layer. To achieve this effect, the hardness variation frequency per 1500 μm in the sheet transverse direction at the 200 μm sheet thickness position needs to be 20 or less. A lower limit of the hardness variation frequency per 1500 μm in the sheet transverse direction at the 200 μm sheet thickness position from the plate surface layer is not particularly limited, but the lower the hardness variation frequency, the better, and the effect of the present disclosure is obtainable even at 0/mm. The hardness variation frequency per 1500 μm in the sheet transverse direction at the 200 μm sheet thickness position is therefore 20 or less. The hardness variation frequency per 1500 μm in the sheet transverse direction at the 200 μm sheet thickness position is preferably 0 or more. The hardness variation frequency per 1500 μm in the sheet transverse direction at the 200 μm sheet thickness position is preferably 10 or less.

Figure 2A:
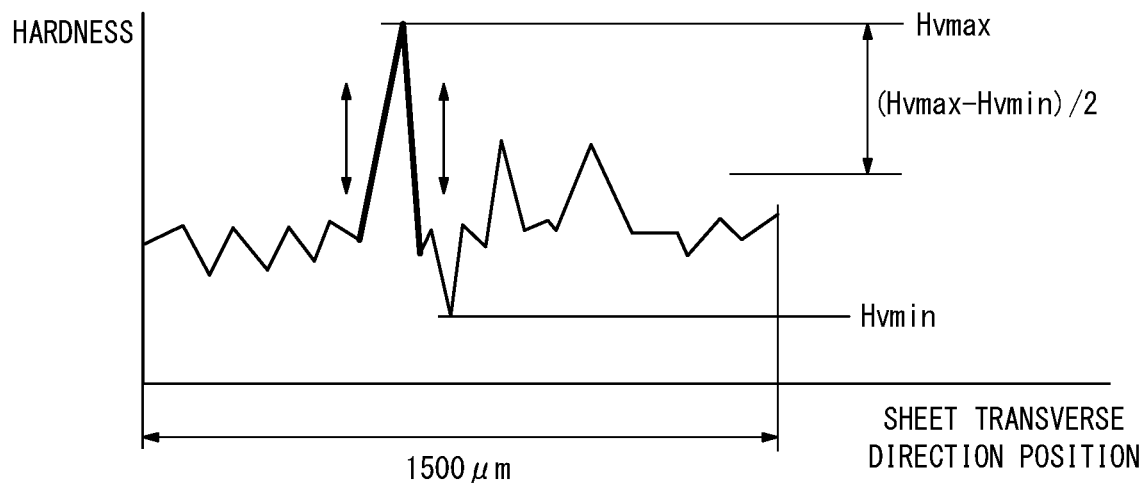
FIG. 2A and FIG. 2B are diagrams for explaining measurement of hardness variation frequency.
Figure 2B:
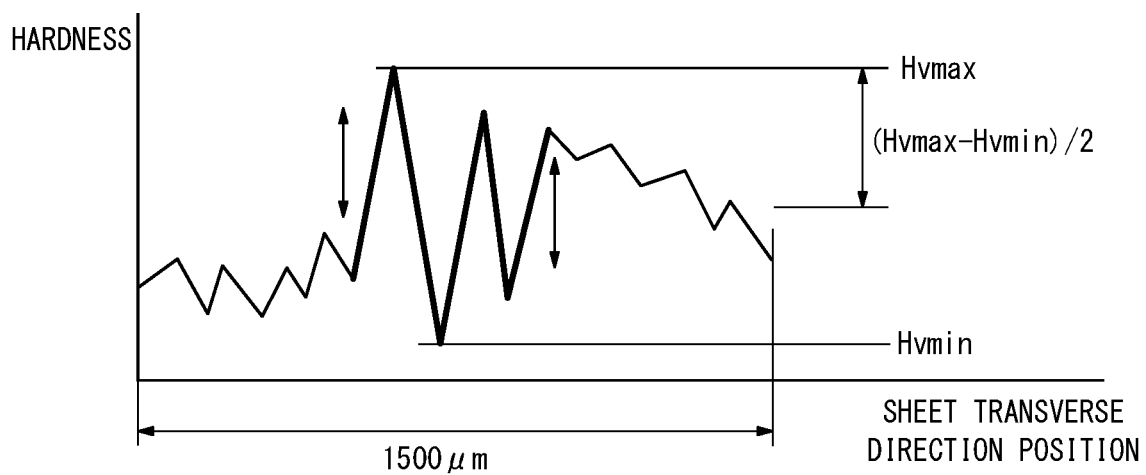

Here, the method for measuring the hardness variation frequency per 1500 μm in the sheet transverse direction at the 200 μm sheet thickness position is as follows. After grinding the steel sheet surface so that the 200 μm sheet thickness position (corresponding to a depth of 200 μm from the steel sheet surface) becomes the observation plane, the observation plane is mirror polished using diamond paste. The observation plane after mirror polishing is measured for Vickers hardness at 100 points along the sheet transverse direction of the plate at 15 μm intervals under a load of 50 gf using a Vickers hardness tester. The measurement positions are central along the sheet transverse direction. From the results obtained, a hardness distribution measured in the sheet transverse direction using the Vickers hardness tester at the 200 μm sheet thickness position is created. In the hardness distribution, a value of {(maximum hardness value $Hv_{max}$)−(minimum hardness value $Hv_{min}$)}/2 is first calculated. The number of times hardness varies in the region (1500 μm in length) where the hardness was measured is counted, with the value {(maximum hardness value $Hv_{max}$)−(minimum hardness value $Hv_{min}$)}/2 as the standard variation amount and a case where the hardness varies up or down by at least the standard variation amount counted as one time. For example, as illustrated in FIG. 2A, when the number of times the hardness distribution curve varies up or down by $(Hv_{max}-Hv_{min})/2$ or more (indicated by a bold line in the drawing) is two times in a range of 1500 µm in the sheet transverse direction, the hardness variation frequency is 2 per 1500 µm in the sheet transverse direction. Further, for example, as illustrated in FIG. 2B, when the number of times the hardness distribution curve varies up or down by $(Hv_{max}-Hv_{min})/2$ or more (indicated by a bold line in the drawing) is five times in a range of 1500 µm in the sheet transverse direction, the hardness variation frequency is 5 per 1500 µm in the sheet transverse direction.

[Surface Layer Softening Thickness: 10 µm or More and 100 µm or Less]

Compared to the ¼ sheet thickness position, softening of the surface layer of the steel sheet may further improve bendability. To achieve this effect, surface layer softening thickness is preferably 10 µm or more. An upper limit of the surface layer softening thickness is not particularly limited. In order to obtain particularly good TS, the surface layer softening thickness is preferably 100 µm or less. Therefore, the surface layer softening thickness is preferably 10 µm or more. The surface layer softening thickness is preferably 100 µm or less. The surface layer softening thickness is more preferably 12 µm or more. The surface layer softening thickness is more preferably 80 µm or less. The surface layer softening thickness is even more preferably 15 µm or more. The surface layer softening thickness is even more preferably 60 µm or less.

Here, the surface layer softening thickness is measured as follows.

A sheet thickness section (L section) parallel to the rolling direction of the steel sheet is smoothed by wet polishing. Then, using a Vickers hardness tester and under a load of 5 gf, hardness is measured at 5 µm intervals in the thickness (depth) direction from a position 10 µm deep from the surface of the steel sheet to a mid-thickness position. The hardness obtained at the ¼ sheet thickness position of the steel sheet is used as a reference hardness, and a depth position where the hardness is the reference hardness×0.85 towards the surface from the ¼ sheet thickness position is identified. The distance (depth) from the surface of the steel sheet to the depth position where the reference hardness× 0.85 is reached is measured, and the measured value is the surface layer softening thickness.

Further, in addition to martensite (including quenched martensite, tempered martensite, and bainite), ferrite, and retained austenite as described above, the effects of the present disclosure are not impaired when the steel microstructure according to the present disclosure also contains pearlite, cementite, metastable carbides (such as epsilon ($\varepsilon$), eta (η), and chi (χ) carbides), and other known steel microstructure, as long as such microstructure has a total area ratio of 3% or less.

[High Strength Steel Sheet]

The chemical composition and steel microstructure of the high strength steel sheet are as described above. Further, thickness of the high strength steel sheet is not particularly limited. Thickness is typically 0.3 mm or more and 2.8 mm or less.

[Coated or Plated Steel Sheet]

The coated or plated steel sheet of the present disclosure is a coated or plated steel sheet with a coated or plated layer on at least one side of the high strength steel sheet of the present disclosure. The type of coated or plated layer is not particularly limited, and may be, for example, a hot-dip coated layer or an electroplated layer. Further, the coated or plated layer may be an alloyed coated or plated layer. The coated or plated layer is preferably a galvanized layer. The galvanized layer may contain Al and Mg. Further, hot-dip zinc-aluminum-magnesium alloy coating (Zn—Al—Mg coated layer) is also preferred. In such a case, Al content is preferably 1 mass % or more. The Al content is preferably 22 mass % or less. Mg content is preferably 0.1 mass % or more. The Mg content is preferably 10 mass % or less. The balance is preferably Zn. Further, in the case of the Zn—Al—Mg coated layer, in addition to Zn, Al, and Mg, a total of 1 mass % or less of one or more elements selected from the group consisting of Si, Ni, Ce, and La may be included. The coated or plated metal is not particularly limited, and therefore may be Al coating or plating or the like, aside from the Zn coating or plating as described above.

Further, the composition of the coated or plated layer is also not particularly limited and may be a typical composition. For example, in the case of a galvanized layer or galvannealed layer, a typical composition consists of: Fe: 20 mass % or less, Al: 0.001 mass % or more and 1.0 mass % or less, and at least one selected from the group consisting of Pb, Sb, Si, Sn, Mg, Mn, Ni, Cr, Co, Ca, Cu, Li, Ti, Be, Bi, and REM in total being 0 mass % or more and 3.5 mass % or less, with the balance being Zn and inevitable impurity. According to the present disclosure, a galvanized layer with a coating weight of 20 g/m² to 80 g/m² per side, further alloyed with a galvannealed layer, is preferred. Further, in a case where the coated or plated layer is a hot-dip galvanized layer, the Fe content in the coated layer may be less than 7 mass %, and in a case where the coated or plated layer is a galvannealed layer, the Fe content in the coated layer may be 7 mass % to 20 mass %.

Next, a method of producing the high strength steel sheet according to the present disclosure is described.

First, a steel slab is produced by melting steel material having the chemical composition described above. According to the present disclosure, a method of preparing the steel material is not particularly limited, and any known preparation method such as use of a converter, an electric furnace, and the like may be applied. A steel slab is preferably produced using continuous casting to prevent macro segregation, yet may be produced using other methods such as ingot casting or thin slab casting. The steel slab thus produced may be cooled to room temperature and then heated again according to a conventional method. Alternatively, an energy-saving process may be employed without problems, such as hot charging or direct rolling in which either a warm slab without being fully cooled to room temperature is charged into a heating furnace, or a steel slab is held at temperature for a very short period and immediately hot rolled.

The steel slab is heated at a slab heating temperature of 1150° C. or more for 100 min or more.

[Slab Heating Temperature: 1150° C. or More]

In the present disclosure, this is a very important component. By setting the slab heating temperature high, to 1150° C. or more, carbides, nitrides, and carbonitrides formed during continuous casting may dissolve, and the total amount of Nb solute and 100 nm or smaller Nb precipitate may increase. Further, by setting the slab heating temperature high, local enrichment of elements in a segregation zone of the slab is reduced, and the hardness variation frequency per 1500 µm in the sheet transverse direction at the 200 µm sheet thickness position may be 20 or less. To obtain these effects, the slab heating temperature is 1150° C. or more. An upper limit of the slab heating temperature is not particularly specified. In order to make less likely an increase in the surface layer softening thickness after annealing and to bring TS within a more suitable range, the slab heating temperature is preferably 1300° C. or less. The slab heating temperature is therefore 1150° C. or more. The slab heating temperature is preferably 1180° C. or more. The slab heating temperature is preferably 1300° C. or less. The slab heating temperature is the temperature of the surface of the steel slab at the time of slab heating.

[Slab Heating Time: 100 Min or More]

In the present disclosure, this is a very important component. By setting the slab heating time to be long, carbides, nitrides, and carbonitrides formed during continuous casting may dissolve, and the total amount of Nb solute and 100 nm or smaller Nb precipitate may increase. Further, by setting the slab heating time to be long, local enrichment of elements in a segregation zone of the slab is reduced, and the hardness variation frequency per 1500 μm in the sheet transverse direction at the 200 μm sheet thickness position may be 20 or less. To obtain these effects, the slab heating time is 100 min or more. An upper limit of the slab heating time is not particularly specified. In order to make less likely an increase in the surface layer softening thickness after annealing and to bring TS within a more suitable range, the slab heating time is preferably 600 min or less. The slab heating time is therefore 100 min or more. The slab heating time is preferably 120 min or more. The slab heating time is preferably 600 min or less.

Further, the steel slab is subjected to rough rolling under normal conditions and formed into a sheet bar. When the slab heating temperature is low, the sheet bar is preferably heated using a bar heater or the like prior to finish rolling, from the viewpoint of preventing trouble during hot rolling.

[Rough Rolling Finish Temperature: 1050° C. or More]

In the present disclosure, this is a very important component. By setting the rough rolling finish temperature high, local enrichment of elements in a segregation zone of the slab is reduced, and the hardness variation frequency per 1500 μm in the sheet transverse direction at the 200 μm sheet thickness position may be 20 or less. To obtain these effects, the rough rolling finish temperature is 1050° C. or more. An upper limit of the rough rolling finish temperature is not particularly specified. In order to make the grain size of prior austenite grains more uniform after annealing, the rough rolling finish temperature is preferably 1200° C. or less. The rough rolling finish temperature is therefore 1050° C. or more. The rough rolling finish temperature is preferably 1080° C. or more. The rough rolling finish temperature is preferably 1200° C. or less. The rough rolling finish temperature is the temperature of the steel sheet surface at the rough rolling finish.

[Finish Rolling Start Temperature: 1000° C. or More]

In the present disclosure, this is a very important component. By setting the finish rolling start temperature high, local enrichment of elements in a segregation zone of the slab is reduced, and the hardness variation frequency per 1500 μm in the sheet transverse direction at the 200 μm sheet thickness position may be 20 or less. To obtain these effects, the finish rolling start temperature is 1000° C. or more. An upper limit of the finish rolling start temperature is not particularly specified. In order to make the grain size of prior austenite grains more uniform after annealing, the finish rolling start temperature is preferably 1180° C. or less. The finish rolling start temperature is therefore 1000° C. or more. The finish rolling start temperature is preferably 1020° C. or more. The finish rolling start temperature is preferably 1180° C. or less. The finish rolling start temperature is the temperature of the steel sheet surface at the finish rolling start.

Finish rolling is preferably carried out at a rolling finish temperature of the $Ar_3$ transformation temperature or more, because otherwise the workability of the annealed sheet may be reduced as a result of increased rolling load and higher rolling reduction of austenite in an un-recrystallized state, resulting in the development of an abnormal microstructure elongated in the rolling direction. Further, for better workability after annealing, the coiling temperature after hot rolling is preferably 300° C. or more. The coiling temperature after hot rolling is preferably 700° C. or less.

Finish rolling may be performed continuously by joining rough-rolled sheets during hot rolling. Further, rough-rolled sheets may be temporarily coiled. Further, at least part of finish rolling may be conducted as lubrication rolling to reduce rolling load in the hot rolling. Conducting lubrication rolling in such a manner is effective from the perspective of making the shape and material properties of the steel sheet uniform. In lubrication rolling, the frictional coefficient is preferably 0.10 or more. The frictional coefficient is preferably 0.25 or less.

The hot-rolled steel sheet thus produced is subjected to pickling. Pickling enables removal of oxides from the steel sheet surface, and is thus important to ensure that the high strength steel sheet as the final product has good chemical convertibility and a sufficient quality of coating. Pickling may be performed in one or more batches.

Next, the hot-rolled sheet after pickling or the hot-rolled sheet after pickling and optional heat treatment (hot-rolled and annealed sheet) is cold-rolled to obtain a cold-rolled sheet. In order to introduce strain uniformly and efficiently and obtain a uniform microstructure, cold rolling is preferably applied by multi-pass rolling that requires two or more passes, such as tandem-type multi-stand rolling, reverse rolling, and the like.

In order to introduce work strain in the steel sheet surface layer and increase the total amount of Nb solute and 100 nm or smaller precipitate in the sheet thickness surface layer during annealing, bending and unbending processes are preferably performed at least once each before cold rolling. The number of each of the bending and unbending processes before cold rolling is not particularly specified. The bending and unbending processes are preferably performed two or more times. The bending and unbending processes are more preferably performed three or more times. The bending and unbending processes prior to cold rolling are generally performed using rolls having a roll diameter of 300 mm to 1500 mm.

[Cumulative Rolling Reduction Ratio of Cold Rolling: 20% or More and 75% or Less]

By setting the cumulative rolling reduction ratio of cold rolling to 20% or more, the area ratio of ferrite may be reduced to less than 10%. Further, by increasing the cumulative rolling reduction ratio of cold rolling, a large amount of shear zone is introduced, and austenite grain size during heating may be made to be a shape close to equiaxed. As a result, YR is controllable to be within the desired range. To achieve these effects, the cumulative rolling reduction ratio of cold rolling is 20% or more. On the other hand, when the cumulative rolling reduction ratio of cold rolling exceeds 75%, the desired YR is not achievable because the grain size of austenite formed during annealing becomes finer and the amount of retained austenite after annealing increases. The cumulative rolling reduction ratio of cold rolling is therefore 20% or more and 75% or less. The cumulative rolling reduction ratio of cold rolling is preferably 25% or more. The cumulative rolling reduction ratio of cold rolling is preferably 70% or less. The cumulative rolling reduction ratio of cold rolling is more preferably 27% or more. The cumulative rolling reduction ratio of cold rolling is more preferably 60% or less.

The cold-rolled sheet obtained as described above is then subjected to annealing. Annealing conditions are as follows.
[Average Heating Rate in Temperature Range of 250° C. or More to 700° C. or Less: 10° C./s or More]

By increasing the average heating rate in the temperature range of 250° C. or more to 700° C. or less, the grain size of austenite formed during heating may be made uniform, that is, the austenite grain size during heating may be made to be a shape close to equiaxed. To achieve this effect, the average heating rate in the temperature range of 250° C. or more to 700° C. or less needs to be 10° C./s or more. An upper limit of the average heating rate in the temperature range of 250° C. or more to 700° C. or less is not particularly specified. From the viewpoint of productivity, the average heating rate is preferably 50° C./s or less. The average heating rate is more preferably 40° C./s or less. The average heating rate in the temperature range of 250° C. or more to 700° C. or less is therefore 10° C./s or more. The average heating rate in the temperature range of 250° C. or more to 700° C. or less is preferably 12° C./s or more. The average heating rate in the temperature range of 250° C. or more to 700° C. or less is preferably 50° C./s or less. The average heating rate in the temperature range of 250° C. or more to 700° C. or less is more preferably 14° C./s or more. The average heating rate in the temperature range of 250° C. or more to 700° C. or less is more preferably 40° C./s or less. The average heating rate is measured based on the temperature of the steel sheet surface.
[Heating Temperature: 820° C. or More]

When the heating temperature (annealing temperature) is less than 820° C., the annealing treatment occurs in a two-phase region of ferrite and austenite, and a large amount of ferrite is contained after annealing, making desired TS, YR, λ, and bendability difficult to achieve. An upper limit of the heating temperature is not particularly specified. An increase in heating temperature increases the surface layer softening thickness after annealing and decreases TS, and therefore the heating temperature is preferably 950° C. or less. The heating temperature is therefore 820° C. or more. The heating temperature is preferably 850° C. or more. The heating temperature is preferably 950° C. or less. The heating temperature is more preferably 870° C. or more. The heating temperature is more preferably 920° C. or less. The heating temperature is measured based on the temperature of the steel sheet surface.
[Time from 750° C. to Heating Temperature: 40 s or More]

In the present disclosure, this is a very important component. By increasing the time from 750° C. to the heating temperature, carbides, nitrides, and carbonitrides may be dissolved, increasing the total amount of Nb solute and 100 nm or smaller precipitate in the sheet thickness surface layer. To achieve these effects, the time from 750° C. to the heating temperature is 40 s or more. An upper limit of the time from 750° C. to the heating temperature is not particularly specified. In order to make the surface layer softening thickness suitable and the TS more suitable, the time is preferably 400 s or less. The time from 750° C. to the heating temperature is therefore 40 s or more. The time from 750° C. to the heating temperature is preferably 45 s or more. The time from 750° C. to the heating temperature is preferably 400 s or less. The time from 750° C. to the heating temperature is more preferably 50 s or more. The time from 750° C. to the heating temperature is more preferably 300 s or less.

The holding time at the heating temperature is not particularly limited. The holding time is preferably 10 s or more. The holding time is preferably 600 s or less.

[Oxygen Concentration of Atmosphere at Heating Temperature: 2 Volume Ppm or More and 30 Volume Ppm or Less (Preferred Condition)]

During annealing, increasing the oxygen concentration at the heating temperature allows decarburization to proceed via oxygen in the air, forming a softening layer in the steel sheet surface layer, which results in more suitable bendability. To achieve these effects, the oxygen concentration at the heating temperature is preferably 2 volume ppm or more. On the other hand, as the oxygen concentration at the heating temperature increases, the surface layer softening thickness after annealing increases and TS decreases, and therefore the oxygen concentration at the heating temperature is preferably 30 volume ppm or less. Therefore, the oxygen concentration at the heating temperature is preferably 2 volume ppm or more. The oxygen concentration at the heating temperature is preferably 30 volume ppm or less. The oxygen concentration at the heating temperature is more preferably 4 volume ppm or more. The oxygen concentration at the heating temperature is more preferably 28 volume ppm or less. The oxygen concentration at the heating temperature is even more preferably 5 volume ppm or more. The oxygen concentration at the heating temperature is even more preferably 25 volume ppm or less. The heating temperature is based on the steel sheet surface temperature. That is, when the steel sheet surface temperature is at the heating temperature, the oxygen concentration is adjusted to a range described above.
[Dew Point of Atmosphere at Heating Temperature: −35° C. or More (Preferred Condition)]

During annealing, increasing the dew point of the atmosphere at the heating temperature allows decarburization to proceed via moisture in the air, forming a softening layer in the steel sheet surface layer, which results in more suitable bendability. To achieve these effects, the dew point at the heating temperature is preferably −35° C. or more. An upper limit of the dew point at the heating temperature is not particularly specified. In order to suitably avoid an increase in surface layer softening thickness after annealing and to keep TS in a more suitable range, the dew point at the heating temperature is preferably 15° C. or less. The dew point at the heating temperature is more preferably 5° C. or less. The dew point of the atmosphere at the heating temperature is therefore preferably −35° C. or more. The dew point of the atmosphere at the heating temperature is more preferably −30° C. or more. The dew point of the atmosphere at the heating temperature is more preferably 15° C. or less. The dew point of the atmosphere at the heating temperature is even more preferably −25° C. or more. The dew point of the atmosphere at the heating temperature is even more preferably 5° C. or less. The heating temperature is based on the steel sheet surface temperature. That is, when the steel sheet surface temperature is at the heating temperature, the dew point is adjusted to a range described above.

Further, the average cooling rate at the heating temperature or less and 400° C. or more is not particularly limited. The average cooling rate is preferably 5° C./s or more. The average cooling rate is preferably 30° C./s or less.
[Average Cooling Rate in Temperature Range from 250° C. or More to 400° C. or Less: 1.0° C./s or More]

In the present disclosure, this is a very important component. By increasing the average cooling rate in the temperature range from 250° C. or more to 400° C. or less, self-tempering of martensite may be inhibited and the hardness variation frequency per 1500 μm in the sheet transverse direction at the 200 μm sheet thickness position may be 20 or less. To achieve these effects, the average cooling rate in the temperature range from 250° C. or more to 400° C. or less is 1.0° C./s or more. An upper limit of the average cooling rate in the temperature range from 250° C. or more to 400° C. or less is not particularly specified. From the viewpoint of productivity, the average cooling rate is preferably 100.0° C./s or less. The average cooling rate is more preferably 80.0° C./s or less. The average cooling rate in the temperature range from 250° C. or more to 400° C. or less is therefore 1.0° C./s or more. The average cooling rate in the temperature range from 250° C. or more to 400° C. or less is preferably 2.0° C./s or more. The average cooling rate in the temperature range from 250° C. or more to 400° C. or less is preferably 100.0° C./s or less. The average cooling rate in the temperature range from 250° C. or more to 400° C. or less is more preferably 3.0° C./s or more. The average cooling rate in the temperature range from 250° C. or more to 400° C. or less is more preferably 80.0° C./s or less. The average cooling rate is measured based on the temperature of the steel sheet surface.

[Cooling Stop Temperature: 150° C. or Less]

When the cooling stop temperature exceeds 150° C., self-tempering of martensite is promoted and the desired range of hardness variation frequency per 1500 μm in the sheet transverse direction at the 200 μm sheet thickness position from the steel sheet surface layer is not achievable. As a result, achieving the desired bendability becomes difficult. A lower limit of the cooling stop temperature is not particularly specified. From the viewpoint of productivity, the cooling stop temperature is preferably room temperature or more. The cooling stop temperature is therefore 150° C. or less. The cooling stop temperature is preferably 100° C. or less. The average stopping speed is measured based on the temperature of the steel sheet surface.

A cooling rate from 250° C. or less to the cooling stop temperature is not particularly specified. In order to increase TS, the average cooling rate from after galvanizing treatment or further alloying treatment to the cooling stop temperature is preferably 2° C./s or more. The average cooling rate is more preferably 5° C./s or more. On the other hand, in view of production technology constraints, the average cooling rate from the galvanizing treatment or further alloying treatment to the cooling stop temperature is preferably 50° C./s or less. The average cooling rate is more preferably 40° C./s or less.

The cold-rolled steel sheet may be cooled from the cooling stop temperature to room temperature. The cooling rate from the cooling stop temperature to room temperature is not particularly limited and cooling to room temperature may be achieved by any method. As a cooling method, gas jet cooling, mist cooling, water cooling, air cooling, and the like may be applied.

After the annealed high strength steel sheet is cooled to the cooling stop temperature as described above, rolling at an elongation rate of 0.05% or more to 1.00% or less may be performed. By setting the elongation rate of rolling conducted after cooling to the cooling stop temperature to 0.05% or more, YR may be controlled within the desired range. Further, by setting the elongation rate of rolling after cooling to the cooling stop temperature to 1.00% or less, the volume fraction of retained austenite may be set within a more suitable range and YR and λ may be set within a more suitable range. The elongation rate of rolling after cooling to the cooling stop temperature is therefore preferably 0.05% or more. The elongation rate is preferably 1.00% or less. The elongation rate is more preferably 0.10% or more. The elongation rate is more preferably 0.50% or less.

Rolling after cooling to the cooling stop temperature may be performed on equipment that is continuous with the continuous annealing equipment (online) or on equipment that is discontinuous with the continuous annealing equipment (offline). Further, the target elongation rate may be achieved in a single rolling or more than one rolling operation may be performed to achieve a total elongation rate of 0.05% or more and 1.00% or less. The rolling described here generally refers to temper rolling, but a method of processing by a tension leveler or the like is also acceptable as long as the method provides an elongation rate equivalent to that of temper rolling.

After cooling to the cooling stop temperature or after further rolling after cooling to the cooling stop temperature, the high strength steel sheet may be subjected to a tempering treatment. By setting the tempering temperature at 400° C. or less, the volume fraction of retained austenite may be kept within a more suitable range. Therefore, when the tempering treatment is applied, the tempering temperature is preferably 400° C. or less. The tempering temperature is more preferably 350° C. or less.

The cooling rate from the tempering temperature to room temperature is not particularly limited and cooling to room temperature may be achieved by any method. As a cooling method, gas jet cooling, mist cooling, water cooling, air cooling, and the like may be applied.

When the high strength steel sheet is to be traded, the high strength steel sheet is typically cooled to room temperature before being traded.

[Method of Producing Coated or Plated Steel Sheet]

The high strength steel sheet produced as described above may be subjected to a coating or plating treatment to obtain a coated or plated steel sheet. As a coating or plating treatment, a hot-dip galvanizing treatment and a treatment of alloying after hot-dip galvanizing are examples. Further, annealing and galvanizing may be performed continuously on a single line. Further, a coated or plated layer may be formed by electroplating such as Zn—Ni electroplated alloy, or hot-dip zinc-aluminum-magnesium alloy coating. Although the above description focuses on the case of zinc coating or plating, the type of coating or plating metal, such as Zn, Al, or the like, is not particularly limited.

When hot-dip galvanizing treatment is performed, the high strength steel sheet is immersed in a galvanizing bath at 440° C. or more and 500° C. or less for the hot-dip galvanizing treatment, after which coating weight adjustment is performed using gas wiping or the like. For hot-dip galvanizing, a galvanizing bath having an Al content of 0.10 mass % or more and 0.23 mass % or less is preferably used. When a galvanized layer is subjected to alloying treatment, the alloying treatment is performed in a temperature range of 470° C. or more to 600° C. or less after hot-dip galvanizing. When less than 470° C., the Zn—Fe alloying rate is excessively slow and productivity is harmed. On the other hand, when the alloying treatment is performed at a temperature exceeding 600° C., untransformed austenite may transform to pearlite, resulting in a decrease in TS. Therefore, when a galvanized layer is subjected to alloying treatment, the alloying treatment is preferably performed in the temperature range from 470° C. or more to 600° C. or less. The alloying treatment is more preferably performed in a temperature range from 470° C. or more to 560° C. or less. Further, electrogalvanization treatment may be performed. Further, the coating weight is preferably 20 g/m$^2$ to 80 g/m$^2$ per side (double-sided coating or plating). A galvannealed steel sheet (GA) preferably has an Fe concentration in the coated or plated layer of 7 mass % to 15 mass %, according to the following alloying treatment.

After the coating or plating treatment, the steel sheet may be subjected to skin pass rolling. The rolling reduction in the skin pass rolling after the coating or plating treatment is preferably 0.05% or more, from the viewpoint of controlling YR to the desired range. An upper limit of the rolling reduction in the skin pass rolling is not particularly limited. In view of productivity, the rolling reduction is preferably 1.50% or less. The skin pass rolling may be performed on-line or off-line. Further, the skin pass may be performed in one or more batches to achieve a target rolling reduction.

Other production conditions are not particularly limited. In view of productivity, the above series of treatments, including annealing, hot-dip galvanizing, alloying treatment, and the like is preferably performed on a continuous galvanizing line (CGL), which is a hot-dip galvanizing line. After the hot-dip galvanizing, wiping may be performed for adjusting the coating amounts. Conditions other than the above, such as coating conditions, may be determined in accordance with conventional hot-dip galvanizing methods.

When the high strength coated or plated steel sheet is to be traded, the high strength steel sheet is typically cooled to room temperature before being traded.

Production conditions other than those described above may be determined according to conventional methods.

[Member]

A member may be provided that is made at least in part using the high strength steel sheet or the high strength coated or plated steel sheet described above. The high strength steel sheet or the high strength coated or plated steel sheet described above may be formed into a target shape by press working, as one example, to make automotive parts. The automotive parts may include a steel sheet other than the high strength steel sheet or the high strength coated or plated steel sheet as a material. According to the present embodiment, the high strength steel sheet having a TS of 1180 MPa or more, combining component dimensional accuracy, stretch flangeability, bendability, and LME resistance may be provided. Accordingly, the high strength steel sheet is suitable as an automotive part that contributes to weight reduction of the automotive body. The high strength steel sheet or the high strength coated or plated steel sheet may be appropriately used in a general member used as an automotive part, particularly a frame structural component or reinforcing component.

Examples

Steels having the chemical compositions listed in Table 1, each with the balance consisting of Fe and inevitable impurity, were prepared by steelmaking in a converter and formed into slabs by continuous casting. The resulting slabs were reheated, hot rolled, subjected to pickling treatment, and cold rolled. The conditions for hot rolling and cold rolling were as listed in Tables 2-1 and 2-2. The coiling temperature was 500° C., the holding time in the heating temperature range was 100 s, and the average cooling rate at the heating temperature or less and 400° C. or more was 20° C./s.

Then, annealing treatment was applied under the conditions listed in Tables 2-1 and 2-2 to obtain high strength steel sheets (CR). Further, some thin steel sheets were subjected to coating or plating treatment to obtain hot-dip galvanized steel sheets (GI), galvannealed steel sheets (GA), and electrogalvanized steel sheets (EG). Used as hot-dip galvanizing baths were a zinc bath containing 0.14 mass % to 0.19 mass % of Al for GI and a zinc bath containing 0.14 mass % of Al for GA, and in each case the bath temperature was 470° C. The coating weight was about 45 g/m² to 72 g/m² per side (double-sided coating) for GI and 45 g/m² per side (double-sided coating) for GA. For GA, the concentration of Fe in the coated layer was 9 mass % or more and 12 mass % or less. In EG, where the plated layer was a Zn—Ni plated layer, the Ni content in the plated layer was 9 mass % or more and 25 mass % or less.

TABLE 1

| Steel sample ID | Chemical composition (mass %) | | | | | | | | | | | | | | | | |
|---|---|---|---|---|---|---|---|---|---|---|---|---|---|---|---|---|---|
| | C | Si | Mn | P | S | Al | N | Nb | Ti | B | O | V | Ta | W | Cr | Mo | Ni |
| A | 0.172 | 0.92 | 3.13 | 0.041 | 0.0028 | 0.022 | 0.0044 | 0.010 | 0.015 | 0.0018 | — | — | — | — | — | — | — |
| B | 0.250 | 0.49 | 3.01 | 0.020 | 0.0033 | 0.032 | 0.0050 | 0.017 | 0.021 | 0.0019 | — | — | — | — | — | — | — |
| C | 0.117 | 0.81 | 3.13 | 0.015 | 0.0026 | 0.022 | 0.0038 | 0.018 | 0.020 | 0.0032 | — | — | — | — | — | — | — |
| D | 0.356 | 0.93 | 3.15 | 0.014 | 0.0008 | 0.033 | 0.0040 | 0.018 | 0.014 | 0.0028 | — | — | — | — | — | — | — |
| E | 0.296 | 0.50 | 3.11 | 0.042 | 0.0030 | 0.042 | 0.0033 | 0.010 | 0.013 | 0.0024 | — | — | — | — | — | — | — |
| F | <u>0.079</u> | 1.19 | 3.19 | 0.035 | 0.0006 | 0.041 | 0.0048 | 0.009 | 0.028 | 0.0016 | — | — | — | — | — | — | — |
| G | <u>0.100</u> | 0.14 | 2.99 | 0.012 | 0.0043 | 0.031 | 0.0039 | 0.018 | 0.014 | 0.0017 | — | — | — | — | — | — | — |
| H | 0.117 | 0.97 | <u>1.90</u> | 0.037 | 0.0010 | 0.040 | 0.0043 | 0.005 | 0.015 | 0.0012 | — | — | — | — | — | — | — |
| I | 0.125 | 0.96 | <u>4.31</u> | 0.044 | 0.0024 | 0.045 | 0.0039 | 0.005 | 0.022 | 0.0011 | — | — | — | — | — | — | — |
| J | 0.105 | 0.97 | <u>3.15</u> | 0.031 | 0.0017 | 0.034 | 0.0029 | <u>0.001</u> | 0.029 | 0.0029 | — | — | — | — | — | — | — |
| K | 0.104 | 0.95 | 3.12 | 0.031 | 0.0002 | 0.033 | 0.0042 | <u>0.008</u> | <u>0.003</u> | 0.0016 | — | — | — | — | — | — | — |
| L | 0.119 | 1.02 | 3.15 | 0.025 | 0.0031 | 0.021 | 0.0046 | 0.008 | <u>0.028</u> | <u>0.0001</u> | — | — | — | — | — | — | — |
| M | 0.100 | 0.30 | 3.29 | 0.020 | 0.0030 | 0.047 | 0.0026 | 0.012 | 0.023 | <u>0.0029</u> | — | — | — | — | — | — | — |
| N | 0.102 | 1.02 | 3.11 | 0.023 | 0.0021 | 0.033 | 0.0040 | 0.007 | 0.008 | 0.0020 | — | — | — | — | — | — | — |
| O | 0.104 | 1.05 | 3.08 | 0.013 | 0.0033 | 0.022 | 0.0037 | 0.009 | <u>1.008</u> | 0.0020 | — | — | — | — | — | — | — |
| P | 0.175 | 0.53 | 2.98 | 0.013 | 0.0041 | 0.041 | 0.0032 | 0.008 | <u>0.013</u> | 0.0017 | 0.0011 | — | — | — | — | — | — |
| Q | 0.228 | 1.04 | 3.11 | 0.032 | 0.0024 | 0.041 | 0.0036 | 0.017 | 0.026 | 0.0020 | — | 0.021 | — | — | — | — | — |
| R | 0.174 | 0.96 | 3.05 | 0.047 | 0.0020 | 0.026 | 0.0037 | 0.018 | 0.013 | 0.0027 | — | — | 0.02 | 0.03 | — | — | — |
| S | 0.272 | 1.08 | 3.01 | 0.044 | 0.0006 | 0.041 | 0.0041 | 0.009 | 0.018 | 0.0010 | — | — | — | — | 0.23 | — | — |
| T | 0.189 | 0.85 | 3.20 | 0.018 | 0.0016 | 0.035 | 0.0035 | 0.009 | 0.025 | 0.0009 | — | — | — | — | — | 0.06 | — |
| U | 0.265 | 0.59 | 3.19 | 0.014 | 0.0033 | 0.030 | 0.0035 | 0.014 | 0.013 | 0.0011 | — | — | — | — | — | — | 0.13 |
| V | 0.180 | 0.71 | 3.15 | 0.016 | 0.0007 | 0.032 | 0.0037 | 0.015 | 0.029 | 0.0012 | — | — | — | — | — | — | — |
| W | 0.211 | 0.81 | 3.09 | 0.014 | 0.0048 | 0.035 | 0.0046 | 0.011 | 0.014 | 0.0014 | — | — | — | — | — | — | — |
| X | 0.132 | 1.08 | 3.19 | 0.020 | 0.0021 | 0.030 | 0.0025 | 0.010 | 0.016 | 0.0029 | — | — | — | — | — | — | — |
| Y | 0.308 | 0.89 | 2.91 | 0.035 | 0.0006 | 0.050 | 0.0039 | 0.012 | 0.017 | 0.0020 | — | — | — | — | — | — | — |
| Z | 0.219 | 1.04 | 2.98 | 0.035 | 0.0029 | 0.023 | 0.0044 | 0.019 | 0.018 | 0.0029 | — | — | — | — | — | — | — |
| a | 0.181 | 1.15 | 3.16 | 0.009 | 0.0034 | 0.042 | 0.0031 | 0.016 | 0.018 | 0.0027 | — | — | — | — | — | — | — |

TABLE 1-continued

| | | | | | | | | | | | | | | | | | | | |
|---|---|---|---|---|---|---|---|---|---|---|---|---|---|---|---|---|---|---|---|
| b | 0.103 | 0.75 | 3.16 | 0.005 | 0.0002 | 0.038 | 0.0050 | 0.011 | 0.028 | 0.0012 | — | — | — | — | — | | | | |
| c | 0.217 | 0.59 | 3.06 | 0.044 | 0.0029 | 0.042 | 0.0036 | 0.004 | 0.014 | 0.0027 | — | — | — | — | — | | | | |

| Steel sample ID | Chemical composition (mass %) | | | | | | | | | | [% Si]/[% Mn] | Free Ti amount (mass %) | Remarks |
|---|---|---|---|---|---|---|---|---|---|---|---|---|---|
| | Co | Cu | Sn | Sb | Ca | Mg | REM | Zr | Te | Hf | Bi | | | |
| A | — | — | — | — | — | — | — | — | — | — | — | 0.29 | 0.004 | Disclosed steel |
| B | — | — | — | — | — | — | — | — | — | — | — | 0.16 | 0.009 | Disclosed steel |
| C | — | — | — | — | — | — | — | — | — | — | — | 0.26 | 0.011 | Disclosed steel |
| D | — | — | — | — | — | — | — | — | — | — | — | 0.29 | 0.002 | Disclosed steel |
| E | — | — | — | — | — | — | — | — | — | — | — | 0.16 | 0.006 | Disclosed steel |
| F | — | — | — | — | — | — | — | — | — | — | — | 0.37 | 0.013 | Comparative steel |
| G | — | — | — | — | — | — | — | — | — | — | — | 0.05 | 0.008 | Comparative steel |
| H | — | — | — | — | — | — | — | — | — | — | — | 0.51 | 0.002 | Comparative steel |
| I | — | — | — | — | — | — | — | — | — | — | — | 0.22 | 0.012 | Comparative steel |
| J | — | — | — | — | — | — | — | — | — | — | — | 0.31 | 0.021 | Comparative steel |
| K | — | — | — | — | — | — | — | — | — | — | — | 0.30 | −0.011 | Comparative steel |
| L | — | — | — | — | — | — | — | — | — | — | — | 0.32 | 0.017 | Comparative steel |
| M | — | — | — | — | — | — | — | — | — | — | — | 0.09 | 0.019 | Comparative steel |
| N | — | — | — | — | — | — | — | — | — | — | — | 0.33 | −0.003 | Comparative steel |
| O | — | — | — | — | — | — | — | — | — | — | — | 0.34 | 1.000 | Comparative steel |
| P | — | — | — | — | — | — | — | — | — | — | — | 0.18 | 0.008 | Disclosed steel |
| Q | — | — | — | — | — | — | — | — | — | — | — | 0.34 | 0.017 | Disclosed steel |
| R | — | — | — | — | — | — | — | — | — | — | — | 0.31 | 0.004 | Disclosed steel |
| S | — | — | — | — | — | — | — | — | — | — | — | 0.36 | 0.005 | Disclosed steel |
| T | — | — | — | — | — | — | — | — | — | — | — | 0.26 | 0.015 | Disclosed steel |
| U | — | — | — | — | — | — | — | — | — | — | — | 0.18 | 0.006 | Disclosed steel |
| V | 0.002 | — | — | — | — | — | — | — | — | — | — | 0.23 | 0.017 | Disclosed steel |
| W | — | 0.18 | — | — | — | — | — | — | — | — | — | 0.26 | 0.006 | Disclosed steel |
| X | — | — | 0.008 | — | — | — | — | — | — | — | — | 0.34 | 0.011 | Disclosed steel |
| Y | — | — | — | 0.011 | — | — | — | — | — | — | — | 0.31 | 0.004 | Disclosed steel |
| Z | — | — | — | — | 0.0003 | — | — | — | — | — | — | 0.35 | 0.007 | Disclosed steel |
| a | — | — | — | — | — | 0.0013 | 0.0027 | — | — | — | — | 0.36 | 0.013 | Disclosed steel |
| b | — | — | — | — | — | — | — | 0.048 | — | — | — | 0.24 | 0.011 | Disclosed steel |
| c | — | — | — | — | — | — | — | — | 0.002 | 0.02 | 0.003 | 0.19 | 0.007 | Disclosed steel |

Underlined: indicates outside the scope of the disclosure.

TABLE 2-1

| No. | Steel sample ID | Hot rolling | | | | Cold rolling | Annealing conditions | |
|---|---|---|---|---|---|---|---|---|
| | | Slab heating temp. (° C.) | Slab heating time (min) | Rough rolling finish temp. (° C.) | Finish rolling start temp. (° C.) | Cumulative rolling reduction ratio (%) | 250° C. to 700° C. average heating rate (° C./s) | Heating temp. (° C.) |
| 1 | A | 1260 | 170 | 1130 | 1110 | 45 | 20 | 880 |
| 2 | B | 1230 | 120 | 1140 | 1110 | 60 | 40 | 910 |
| 3 | C | 1250 | 200 | 1120 | 1020 | 40 | 20 | 880 |
| 4 | C | <u>1130</u> | 200 | 1120 | 1020 | 40 | 20 | 880 |
| 5 | C | 1250 | <u>30</u> | 1120 | 1020 | 40 | 20 | 880 |
| 6 | C | 1250 | 200 | <u>1030</u> | 1020 | 40 | 20 | 880 |
| 7 | C | 1250 | 200 | 1120 | <u>950</u> | 40 | 20 | 880 |
| 8 | C | 1250 | 200 | 1120 | 1020 | <u>10</u> | 20 | 880 |
| 9 | C | 1250 | 200 | 1120 | 1020 | <u>85</u> | 20 | 880 |
| 10 | C | 1250 | 200 | 1120 | 1020 | 40 | <u>5</u> | 880 |
| 11 | C | 1250 | 200 | 1120 | 1020 | 40 | 20 | <u>750</u> |
| 12 | C | 1250 | 200 | 1120 | 1020 | 40 | 20 | 880 |
| 13 | C | 1250 | 200 | 1120 | 1020 | 40 | 20 | 880 |
| 14 | C | 1250 | 200 | 1120 | 1020 | 40 | 20 | 880 |
| 15 | D | 1300 | 170 | 1110 | 1100 | 60 | 18 | 820 |
| 16 | E | 1260 | 120 | 1130 | 1110 | 45 | 10 | 910 |
| 17 | F | 1200 | 230 | 1150 | 1120 | 50 | 18 | 900 |
| 18 | <u>G</u> | 1200 | 230 | 1150 | 1120 | 50 | 18 | 900 |
| 19 | <u>H</u> | 1200 | 230 | 1150 | 1120 | 50 | 18 | 900 |
| 20 | <u>I</u> | 1200 | 230 | 1150 | 1120 | 50 | 18 | 900 |

| No. | Annealing conditions | | | | | | |
|---|---|---|---|---|---|---|---|
| | Time from 750° C. to heating temp. (s) | Oxygen concentration at heating temp. (ppm) | Dew point at heating temp. range (° C.) | Average cooling rate in temp. range from 250°C. or more to 400° C. or less (° C./s) | Cooling stop temp. (° C.) | Type* | Remarks |
| 1 | 50 | 13 | −17 | 14.7 | 50 | CR | Example |
| 2 | 200 | 17 | −11 | 9.8 | 80 | GA | Example |
| 3 | 100 | 15 | −13 | 5.0 | Room temp. | GA | Example |
| 4 | 100 | 11 | −13 | 5.0 | Room temp. | GA | Comparative Example |
| 5 | 100 | 11 | −13 | 5.0 | Room temp. | GA | Comparative Example |
| 6 | 100 | 11 | −13 | 5.0 | Room temp. | GA | Comparative Example |
| 7 | 100 | 11 | −13 | 5.0 | Room temp. | GA | Comparative Example |
| 8 | 100 | 11 | −13 | 5.0 | Room temp. | GA | Comparative Example |
| 9 | 100 | 11 | −13 | 5.0 | Room temp. | GA | Comparative Example |
| 10 | 100 | 11 | −13 | 5.0 | Room temp. | GA | Comparative Example |
| 11 | 100 | 13 | −9 | 5.0 | Room temp. | GA | Comparative Example |
| 12 | <u>10</u> | 17 | −13 | 5.0 | Room temp. | GA | Comparative Example |
| 13 | 100 | 17 | −13 | <u>0.5</u> | Room temp. | GA | Comparative Example |
| 14 | 100 | 17 | −13 | 5.0 | <u>200</u> | GA | Comparative Example |
| 15 | 45 | 12 | −5 | 9.8 | Room temp. | GI | Disclosed steel |
| 16 | 200 | 11 | −25 | 20.4 | Room temp. | GA | Disclosed steel |
| 17 | 150 | 14 | −13 | 3.0 | 50 | GA | Comparative steel |
| 18 | 150 | 14 | −13 | 3.0 | 50 | GA | Comparative steel |

TABLE 2-1-continued

| | | | | | | | |
|---|---|---|---|---|---|---|---|
| 19 | 150 | 14 | −13 | 3.0 | 50 | GA | Comparative steel |
| 20 | 150 | 14 | −13 | 3.0 | 50 | GA | Comparative steel |

Underlined: indicates outside the scope of the disclosure.

*CR: cold-rolled steel sheet (uncoated),
GI: hot-dip galvanized steel sheet (without alloying treatment),
GA: galvannealed steel sheet
EG: Electrogalvanized steel sheet (Zn—Ni alloy plating)

TABLE 2-2

| | | Hot rolling | | | | Cold rolling | Annealing conditions | |
|---|---|---|---|---|---|---|---|---|
| No. | Steel sample ID | Slab heating temp. (° C.) | Slab heating time (min) | Rough rolling finish temp. (° C.) | Finish rolling start temp. (° C.) | Cumulative rolling reduction ratio (%) | 250° C. to 700° C. average heating rate (° C./s) | Heating temp. (° C.) |
| 21 | J | 1200 | 230 | 1150 | 1120 | 50 | 18 | 900 |
| 22 | K̲ | 1200 | 230 | 1150 | 1120 | 50 | 18 | 900 |
| 23 | L̲ | 1200 | 230 | 1150 | 1120 | 50 | 18 | 900 |
| 24 | M̲ | 1200 | 230 | 1150 | 1120 | 50 | 18 | 900 |
| 25 | N̲ | 1200 | 230 | 1150 | 1120 | 50 | 18 | 900 |
| 26 | O̲ | 1200 | 230 | 1150 | 1120 | 50 | 18 | 900 |
| 27 | P̲ | 1260 | 400 | 1080 | 1050 | 70 | 24 | 890 |
| 28 | Q | 1260 | 170 | 1110 | 1100 | 25 | 15 | 900 |
| 29 | R | 1230 | 300 | 1110 | 1100 | 60 | 14 | 920 |
| 30 | S | 1260 | 400 | 1130 | 1110 | 45 | 14 | 870 |
| 31 | T | 1260 | 170 | 1100 | 1050 | 30 | 25 | 910 |
| 32 | U | 1230 | 120 | 1110 | 1070 | 25 | 14 | 930 |
| 33 | V | 1260 | 170 | 1130 | 1110 | 60 | 26 | 890 |
| 34 | W | 1300 | 170 | 1180 | 1110 | 45 | 31 | 920 |
| 35 | X | 1230 | 170 | 1130 | 1110 | 35 | 27 | 890 |
| 36 | Y | 1260 | 170 | 1110 | 1050 | 45 | 34 | 900 |
| 37 | Z | 1260 | 120 | 1130 | 1100 | 45 | 27 | 870 |
| 38 | a | 1230 | 200 | 1130 | 1100 | 50 | 20 | 900 |
| 39 | b | 1230 | 230 | 1130 | 1100 | 55 | 20 | 950 |
| 40 | c | 1270 | 200 | 1130 | 1090 | 50 | 18 | 900 |

| | Annealing conditions | | | | | | |
|---|---|---|---|---|---|---|---|
| No. | Time from 750° C. to heating temp. (s) | Oxygen concentration at heating temp. (ppm) | Dew point at heating temp. range (° C.) | Average cooling rate in temp. range from 250°C. or more to 400° C. or less (° C./s) | Cooling stop temp. (° C.) | Type* | Remarks |
| 21 | 150 | 14 | −13 | 3.0 | 50 | GA | Comparative steel |
| 22 | 150 | 14 | −13 | 3.0 | 50 | EG | Comparative steel |
| 23 | 150 | 14 | −13 | 3.0 | 50 | GA | Comparative steel |
| 24 | 150 | 14 | −13 | 3.0 | 50 | GA | Comparative steel |
| 25 | 150 | 14 | −13 | 3.0 | 50 | GA | Comparative steel |
| 26 | 150 | 14 | −13 | 3.0 | 50 | GA | Comparative steel |
| 27 | 300 | 22 | 5 | 19.7 | 50 | GA | Disclosed steel |
| 28 | 400 | 18 | −2 | 14.5 | 50 | GA | Disclosed steel |
| 29 | 50 | 27 | −19 | 9.7 | Room temp. | GA | Disclosed steel |
| 30 | 45 | 14 | −25 | 10.1 | 50 | CR | Disclosed steel |
| 31 | 300 | 12 | −16 | 15.1 | Room temp. | CR | Disclosed steel |
| 32 | 50 | 1 | −16 | 10.3 | 80 | GA | Disclosed steel |
| 33 | 45 | 34 | −16 | 29.8 | Room temp. | GA | Disclosed steel |

TABLE 2-2-continued

| 34 | 200 | 12 | −36 | 14.5 | 80  | GI | Disclosed steel |
| 35 | 50  | 11 | −25 | 15.2 | 100 | GA | Disclosed steel |
| 36 | 300 | 20 | −24 | 30.3 | 50  | GA | Disclosed steel |
| 37 | 200 | 11 | −13 | 9.9  | 50  | GA | Disclosed steel |
| 38 | 60  | 12 | −15 | 7.9  | 50  | GA | Disclosed steel |
| 39 | 180 | 12 | −20 | 8.4  | 50  | GA | Disclosed steel |
| 40 | 60  | 11 | −15 | 3.1  | 50  | GA | Disclosed steel |

Underlined: indicates outside the scope of the disclosure.
*CR: cold-rolled steel sheet (uncoated),
GI: hot-dip galvanized steel sheet (without alloying treatment),
GA: galvannealed steel sheet
EG: Electrogalvanized steel sheet (Zn—Ni alloy plating)

The high strength steel sheets and the high strength coated or plated steel sheets obtained as described above were used as test samples to evaluate tensile properties, stretch flangeability, bendability, and LME resistance according to the following test methods. The results are listed in Tables 3-1 and 3-2.

[Tensile Test]

Tensile testing was performed in accordance with Japanese Industrial Standard JIS Z 2241. From the obtained steel sheets, JIS No. 5 test pieces were taken in a direction perpendicular to the rolling direction of the steel sheets, and tensile tests were conducted at a crosshead speed of $1.67 \times 10^{-1}$ mm/s to measure YS, TS, and El. According to the present disclosure, a TS of 1180 MPa or more was considered to be acceptable (pass). Further, dimensional accuracy of a component was judged to be good when the yield ratio (YR) as an index of dimensional accuracy of a component was 65% or more and 90% or less. YR was calculated using the calculation method described with reference to Formula (2) above.

[Hole expanding Test]

The hole expanding test was performed in accordance with JIS Z 2256. After shearing an obtained steel sheet to 100 mm×100 mm and punching a hole having a diameter of 10 mm and a clearance of 12.5%, a die having an inner diameter of 75 mm was used to press a conical punch having an apex angle of 60° into the hole with a blank holding force of 9 tonnes (88.26 kN) to measure the hole diameter at the crack initiation limit. The maximum hole expansion ratio of λ (%) was obtained from the following formula, and the hole expansion formability was evaluated from the value of the maximum hole expansion ratio.

maximum hole expansion ratio: $\lambda\ (\%) = \{(D_f - D_0)/D_0\} \times 100$

Here, $D_f$ is the hole diameter (mm) at crack initiation and $D_0$ is the initial hole diameter (mm). According to the present disclosure, stretch flangeability is judged to be good when the value of the hole expansion ratio (2) as an index of stretch flangeability is 25% or more, regardless of the strength of the steel sheet.

[Bend Test]

The bend test was performed in accordance with JIS Z 2248. Samples of strips 30 mm wide and 100 mm long were taken from the obtained steel sheets so that a direction parallel to the rolling direction of the steel sheet was the axial direction of the bend test. Subsequently, a 90° V-bend test was performed under the conditions that the indentation load was 100 kN and the indentation holding time was 5 s. According to the present disclosure, bendability was evaluated by the pass rate of the bend test. Where R is bend radius and t is sheet thickness, five samples were subjected to the bend test at a maximum value of R where R/t is 5 or less (for example, when sheet thickness is 1.2 mm, bend radius is 6.0 mm), and then cracking at a ridge of the tip of each bend test sample was evaluated. When all five samples did not crack, bendability was judged to be excellent. Further, bendability was judged to be "good" when a microfissure of less than 200 μm was observed in one or more of the five samples. Further, bendability was judged to be "poor" when a microfissure of 200 μm or more was observed in one or more of the five samples. Here, the presence or absence of cracks was evaluated by measuring the ridge at the tip of the bend test sample using a digital microscope (RH-2000, manufactured by Hirox Co. Ltd.) at 40× magnification.

[LME Resistance]

LME resistance was determined by high temperature tensile testing. Samples of the high strength steel sheets (CR) and the coated or plated steel sheets (GI, GA, EG) were taken in strips 105 mm wide and 25 mm long so that the direction perpendicular to the rolling direction of the steel sheets was the tensile direction in the high temperature tensile testing. End faces of the samples were then ground to a width of 99 mm and a length of 20 mm. Tensile test pieces were then prepared with a shoulder radius of 20 mm, a parallel portion width of 5 mm, and a parallel portion length of 20 mm. Further, notches having a notch radius of 2 mm and a distance of 3 mm between notch tips were made centrally in the parallel portions of the tensile test pieces to obtain notched tensile test pieces. From the viewpoint of securing contact with the electrode, one side of the steel sheet was ground to adjust sheet thickness to 1.0 mm. The obtained notched tensile test pieces were subjected to high temperature tensile testing using a hot working simulator (Thermec Master Z). After the temperature was raised to 900° C. at 100° C./s, gas cooling was immediately performed at 40° C./s. After reaching 700° C., tensile testing was immediately performed at a crosshead speed of 50 mm/s until fracture. After test piece fracture, gas cooling was performed at 100° C./s to 200° C. or less.

Samples for thickness reduction measurement were taken by cutting the fractured portions of the test pieces subjected to the high temperature tensile testing as described above so that sheet thickness cross sections (L section) parallel to the tensile direction of the test pieces became the observation planes. Sheet thickness reduction indicated by the above Formula (3) was then determined. According to the present disclosure, thickness reduction of 0.20 or more was judged to be excellent LME resistance.

Further, the area ratio of martensite and ferrite, the volume fraction of retained austenite, the average value of the ratio of grain size in the rolling direction to grain size in the thickness direction of prior austenite grains, the hardness variation frequency per 1500 μm in the sheet transverse direction at the 200 μm sheet thickness position from the steel sheet surface layer, and the surface layer softening thickness were evaluated. Further, the residual microstructure was observed by the method described below. The test samples were cut so that the observation plane was a sheet thickness cross section (L section) parallel to the rolling direction of the steel sheets. The observation plane was then mirror polished using diamond paste, followed by finish polishing using colloidal silica, and then etching with 3 vol % nital to reveal the microstructure. Under a condition of 15 kV accelerating voltage, three views of 17 μm×23 μm fields of view were observed at a magnification of 5000× using a scanning electron microscope (SEM), with a ¼ sheet thickness position of the steel sheet as the observation position. Cementite was identified as the residual microstructure from the obtained microstructure images.

TABLE 3-1

| No. | Steel sample ID | M area ratio (%) | α area ratio (%) | Retained γ volume fraction (%) | Total amount of Nb solute and 100 nm or smaller precipitate in sheet thickness surface layer (%) | Average value of ratio of grain size in rolling direction to grain size in thickness direction of prior γ grains (—) | Hardness variation frequency per 1500 μm in sheet transverse direction at 200 μm sheet thickness position (Times) | Surface layer softening thickness (μm) | Residual microstructure Type |
|---|---|---|---|---|---|---|---|---|---|
| 1 | A | 91 | 3 | 3.3 | 0.008 | 1.3 | 12 | 51 | θ |
| 2 | B | 89 | 4 | 4.5 | 0.013 | 1.9 | 8 | 47 | θ |
| 3 | C | 87 | 4 | 6.0 | 0.008 | 1.0 | 4 | 45 | θ |
| 4 | C | 88 | 4 | 5.4 | <u>0.001</u> | 1.3 | <u>22</u> | 20 | θ |
| 5 | C | 88 | 4 | 5.9 | <u>0.001</u> | 0.9 | <u>22</u> | 28 | θ |
| 6 | C | 92 | 0 | 5.3 | <u>0.006</u> | 1.4 | <u>21</u> | 54 | θ |
| 7 | C | 87 | 5 | 5.5 | 0.013 | 0.6 | <u>25</u> | 24 | θ |
| 8 | C | <u>65</u> | <u>29</u> | 4.7 | 0.012 | <u>3.0</u> | <u>16</u> | 17 | θ |
| 9 | C | <u>82</u> | <u>4</u> | 11.3 | 0.007 | <u>1.3</u> | 4 | 24 | θ |
| 10 | C | 85 | 7 | 5.9 | 0.009 | <u>2.8</u> | 8 | 29 | θ |
| 11 | C | <u>66</u> | <u>27</u> | 4.9 | 0.009 | <u>1.6</u> | 0 | 35 | θ |
| 12 | C | <u>88</u> | <u>5</u> | 4.8 | <u>0.001</u> | 1.6 | 12 | 60 | θ |
| 13 | C | 85 | 7 | 5.6 | <u>0.004</u> | 0.6 | <u>21</u> | 31 | θ |
| 14 | C | 92 | 0 | 5.7 | 0.013 | 1.6 | <u>23</u> | 55 | θ |
| 15 | D | 93 | 4 | 1.2 | 0.014 | 1.0 | <u>14</u> | 43 | θ |
| 16 | E | 94 | 0 | 3.7 | 0.006 | 1.2 | 12 | 20 | θ |
| 17 | F | <u>67</u> | <u>25</u> | 5.8 | 0.006 | 1.5 | 16 | 47 | θ |
| 18 | <u>G</u> | 90 | <u>3</u> | 4.8 | 0.010 | 1.9 | <u>22</u> | 35 | θ |
| 19 | <u>H</u> | <u>65</u> | <u>29</u> | 4.9 | 0.003 | 0.9 | 8 | 55 | θ |
| 20 | <u>I</u> | <u>85</u> | <u>7</u> | 5.0 | 0.002 | 1.7 | <u>21</u> | 44 | θ |

| No. | Residual microstructure Area ratio (%) | YS (MPa) | TS (MPa) | YR (%) | El (%) | λ (%) | Bendability | Thickness reduction (—) | Remarks |
|---|---|---|---|---|---|---|---|---|---|
| 1 | 2.7 | 1194 | 1493 | 80 | 10 | 42 | Excellent | 0.23 | Example |
| 2 | 2.5 | 1450 | 1859 | 78 | 8 | 38 | Excellent | 0.47 | Example |
| 3 | 3.0 | 1041 | 1254 | 83 | 8 | 25 | Excellent | 0.39 | Example |
| 4 | 2.6 | 1004 | 1255 | 80 | 7 | 29 | <u>Poor</u> | <u>0.18</u> | Comparative Example |
| 5 | 2.1 | 1046 | 1230 | 85 | 10 | 41 | <u>Poor</u> | <u>0.07</u> | Comparative Example |
| 6 | 2.7 | 982 | 1198 | 82 | 6 | 51 | <u>Poor</u> | 0.36 | Comparative Example |
| 7 | 2.5 | 826 | 1180 | 70 | 8 | 36 | <u>Poor</u> | 0.36 | Comparative Example |
| 8 | 1.3 | 686 | <u>1143</u> | <u>60</u> | 9 | <u>23</u> | <u>Poor</u> | 0.36 | Comparative Example |
| 9 | 2.7 | 766 | 1235 | <u>62</u> | 9 | <u>22</u> | Excellent | 0.40 | Comparative Example |
| 10 | 2.1 | 764 | 1252 | <u>61</u> | 6 | 32 | Excellent | 0.32 | Comparative Example |
| 11 | 2.1 | 660 | <u>1082</u> | <u>61</u> | 10 | <u>16</u> | <u>Poor</u> | 0.36 | Comparative Example |
| 12 | 2.2 | 984 | 1262 | 78 | 8 | 47 | Excellent | <u>0.17</u> | Comparative Example |
| 13 | 2.4 | 925 | 1250 | 74 | 7 | 45 | <u>Poor</u> | 0.32 | Comparative Example |

TABLE 3-1-continued

| | | | | | | | | | |
|---|---|---|---|---|---|---|---|---|---|
| 14 | 2.3 | 951 | 1251 | 76 | 8 | 27 | Poor | 0.37 | Comparative Example |
| 15 | 1.8 | 1686 | 2031 | 83 | 9 | 39 | Excellent | 0.20 | Example |
| 16 | 2.3 | 1445 | 1876 | 77 | 7 | 46 | Excellent | 0.31 | Example |
| 17 | 2.2 | 676 | <u>1091</u> | <u>62</u> | 10 | <u>23</u> | Poor | 0.22 | Comparative Example |
| 18 | 2.2 | 1071 | 1217 | 88 | 10 | 48 | Poor | 0.31 | Comparative Example |
| 19 | 1.1 | 689 | <u>1111</u> | <u>62</u> | 10 | <u>20</u> | Poor | 0.22 | Comparative Example |
| 20 | 3.0 | 824 | 1212 | 68 | 9 | 48 | Poor | 0.24 | Comparative Example |

Underlined: indicates outside the scope of the disclosure.
M: martensite
α: ferrite
γ: austenite
θ: cementite and/or metastable carbides

TABLE 3-2

| No. | Steel sample ID | M area ratio (%) | α area ratio (%) | Retained γ volume fraction (%) | Total amount of Nb solute and 100 nm or smaller precipitate in sheet thickness surface layer (%) | Average value of ratio of grain size in rolling direction to grain size in thickness direction of prior γ grains (—) | Hardness variation frequency per 1500 μm in sheet transverse direction at 200 μm sheet thickness position (Times) | Surface layer softening thickness (μm) | Residual microstructure Type |
|---|---|---|---|---|---|---|---|---|---|
| 21 | J | 86 | 6 | 5.5 | <u>0.001</u> | 1.7 | 12 | 56 | θ |
| 22 | <u>K</u> | 89 | 3 | 5.6 | <u>0.001</u> | 0.6 | 6 | 30 | θ |
| 23 | <u>L</u> | <u>68</u> | <u>25</u> | 4.3 | 0.003 | 1.7 | 8 | 22 | θ |
| 24 | <u>M</u> | <u>85</u> | <u>7</u> | 5.8 | 0.010 | 0.7 | <u>22</u> | 37 | θ |
| 25 | <u>N</u> | 88 | 4 | 5.0 | <u>0.001</u> | 0.9 | 6 | 42 | θ |
| 26 | <u>O</u> | 89 | 3 | 5.0 | <u>0.001</u> | 0.9 | 16 | 17 | θ |
| 27 | <u>P</u> | 92 | 1 | 4.4 | <u>0.005</u> | 1.8 | 8 | 86 | θ |
| 28 | Q | 94 | 1 | 2.6 | 0.004 | 1.6 | 4 | 44 | θ |
| 29 | R | 89 | 7 | 2.3 | 0.011 | 1.9 | 14 | 53 | θ |
| 30 | S | 92 | 3 | 2.8 | 0.007 | 0.6 | 8 | 41 | θ |
| 31 | T | 93 | 0 | 4.1 | 0.006 | 1.7 | 6 | 50 | θ |
| 32 | U | 95 | 0 | 2.4 | 0.004 | 1.6 | 12 | 8 | θ |
| 33 | V | 93 | 2 | 2.5 | 0.014 | 1.1 | 12 | 71 | θ |
| 34 | W | 90 | 5 | 2.8 | 0.004 | 1.5 | 4 | 5 | θ |
| 35 | X | 88 | 3 | 6.0 | 0.006 | 1.9 | 8 | 31 | θ |
| 36 | Y | 96 | 0 | 1.4 | 0.006 | 1.8 | 16 | 37 | θ |
| 37 | Z | 94 | 0 | 3.9 | 0.012 | 0.8 | 4 | 30 | θ |
| 38 | a | 95 | 0 | 2.8 | 0.004 | 0.5 | 12 | 35 | θ |
| 39 | b | 92 | 0 | 5.2 | 0.008 | 0.7 | 8 | 52 | θ |
| 40 | c | 88 | 7 | 2.8 | 0.002 | 1.7 | 8 | 33 | θ |

| No. | Residual microstructure Area ratio (%) | YS (MPa) | TS (MPa) | YR (%) | El (%) | λ (%) | Bendability | Thickness reduction (—) | Remarks |
|---|---|---|---|---|---|---|---|---|---|
| 21 | 2.5 | 883 | 1193 | 74 | 9 | 39 | Excellent | <u>0.10</u> | Comparative Example |
| 22 | 2.4 | 1085 | 1276 | 85 | 9 | 45 | Excellent | <u>0.15</u> | Comparative Example |
| 23 | 2.7 | 695 | <u>1140</u> | <u>61</u> | 10 | <u>17</u> | Poor | 0.25 | Comparative Example |
| 24 | 2.2 | 906 | 1192 | 76 | 7 | 44 | Poor | 0.47 | Comparative Example |
| 25 | 3.0 | 990 | 1253 | 79 | 6 | 52 | Excellent | <u>0.17</u> | Comparative Example |
| 26 | 3.0 | 908 | 1210 | 75 | 8 | 36 | Poor | <u>0.07</u> | Comparative Example |
| 27 | 2.6 | 1076 | 1494 | 72 | 10 | 53 | Excellent | 0.38 | Example |
| 28 | 2.4 | 1376 | 1835 | 75 | 8 | 41 | Excellent | 0.21 | Example |
| 29 | 1.7 | 1358 | 1598 | 85 | 10 | 33 | Excellent | 0.25 | Example |
| 30 | 2.2 | 1338 | 1784 | 75 | 8 | 30 | Excellent | 0.21 | Example |
| 31 | 2.9 | 1457 | 1777 | 82 | 7 | 28 | Excellent | 0.34 | Example |
| 32 | 2.6 | 1349 | 1823 | 74 | 9 | 33 | Good | 0.30 | Example |

TABLE 3-2-continued

| | | | | | | | | | |
|---|---|---|---|---|---|---|---|---|---|
| 33 | 2.5 | 1337 | 1519 | 88 | 7 | 28 | Excellent | 0.31 | Example |
| 34 | 2.2 | 1086 | 1574 | 69 | 10 | 54 | Good | 0.32 | Example |
| 35 | 3.0 | 926 | 1424 | 65 | 10 | 39 | Excellent | 0.28 | Example |
| 36 | 2.6 | 1523 | 2031 | 75 | 6 | 25 | Excellent | 0.34 | Example |
| 37 | 2.1 | 1230 | 1519 | 81 | 8 | 26 | Excellent | 0.24 | Example |
| 38 | 2.2 | 1379 | 1585 | 87 | 7 | 48 | Excellent | 0.25 | Example |
| 39 | 2.8 | 959 | 1245 | 77 | 9 | 50 | Excellent | 0.34 | Example |
| 40 | 2.2 | 1035 | 1479 | 70 | 6 | 54 | Excellent | 0.38 | Example |

Underlined: indicates outside the scope of the disclosure.
M: martensite
α: ferrite
γ: austenite
θ: cementite and/or metastable carbides As indicated in Tables 3-1 and 3-2, the TS of the Examples was 1180 MPa or more, and the component dimensional accuracy, stretch flangeability, bendability, and LME resistance were all excellent. In contrast, one or more of the following properties were judged to be poor for the Comparative Examples: strength (TS), component dimensional accuracy (YR), stretch flangeability (2), bendability, or LME resistance.

Embodiments of the present disclosure are described above, but the present disclosure is not limited to these embodiments. That is, a person skilled in the art may make various modifications to the embodiments, Examples, and operation techniques disclosed herein, and all such modifications still fall within the scope of the claims which follow. For example, in the above-described series of heat treatment processes of the production method disclosed herein, any apparatus or the like may be used to perform the processes on the steel sheet as long as the thermal hysteresis conditions are met.

INDUSTRIAL APPLICABILITY

By applying the high strength steel sheet of the present disclosure to a structural member such as an automotive part, for example, fuel efficiency may be improved by automotive body weight reduction.

The invention claimed is:

1. A high strength steel sheet comprising a chemical composition containing, in mass %,
C: 0.090% or more and 0.390% or less,
Si: 0.01% or more and 2.50% or less,
Mn: 2.00% or more and 4.00% or less,
P: 0.100% or less,
S: 0.0200% or less,
Al: 0.100% or less,
N: 0.0100% or less,
Nb: 0.002% or more and 0.100% or less,
Ti: 0.005% or more and 0.100% or less, and
B: 0.0002% or more and 0.0100% or less, wherein
[% Si]/[% Mn] is 0.10 or more and 0.60 or less, and
free Ti content determined from Formula (1), below, is 0.001 mass % or more,
with the balance being Fe and inevitable impurity, wherein
in a steel sheet surface layer, up to 100 μm from the surface of the steel sheet, a total amount of Nb solute and Nb precipitate having a diameter of 100 nm or smaller is 0.002 mass % or more with respect to the mass of the steel sheet surface layer,
the steel microstructure at a ¼ sheet thickness position comprising:
area ratio of martensite: 78% or more,
area ratio of ferrite: 10% or less,
volume fraction of retained austenite: less than 10.0%, wherein
an average value of a ratio of grain size in the rolling direction to grain size in the thickness direction of prior austenite grains is 2.0 or less, wherein the average value of ratio is obtained by averaging the ratios of the grain size in the rolling direction to the grain size in the thickness direction of prior austenite grains in three 169 μm×225 μm views taken of a thickness cross section, parallel to the rolling direction, of the steel sheet,
hardness variation frequency is 20 or less per 1500 μm in the sheet transverse direction at a 200 μm sheet thickness position, wherein the hardness is Vickers hardness measured with a 50 gf load, and the hardness variation frequency is determined by counting, in a 1500 μm length at 15 μm intervals, the number of times the hardness varies up or down by at least (Hvmax−Hvmin)/2, where Hvmax is the maximum hardness value over the 1500 μm length and Hvmin is the minimum hardness value over the 1500 μm length, and tensile strength of the steel sheet is 1180 MPa or more, $$\text{free Ti content (\%)} = [\% \text{ Ti}] - (47.9/14.0) \times [\% \text{ N}] - (47.9/32.1) \times [\% \text{ S}] \quad (1)$$

where [% X] in Formula (1) represents content of element X in the steel in mass %, and is 0 when not present.

2. The high strength steel sheet according to claim 1, the steel microstructure further comprising a surface layer softening thickness of 10 μm or more and 100 μm or less, wherein the surface layer softening thickness is the distance from the steel sheet surface to a depth position where the hardness is a reference hardness×0.85, the reference hardness being the hardness at the ¼ sheet thickness position.

3. The high strength steel sheet according to claim 1, the chemical composition further containing, in mass %, at least one element selected from the group consisting of:
O: 0.0100% or less,
V: 0.200% or less,
Ta: 0.10% or less,
W: 0.10% or less,
Cr: 1.00% or less,
Mo: 1.00% or less,
Ni: 1.00% or less,
Co: 0.010% or less,
Cu: 1.00% or less,
Sn: 0.200% or less,
Sb: 0.200% or less,
Ca: 0.0100% or less, Mg: 0.0100% or less,
REM: 0.0100% or less,
Zr: 0.100% or less,
Te: 0.100% or less,
Hf: 0.10% or less, and
Bi: 0.200% or less.

4. A high strength coated or plated steel sheet comprising the high strength steel sheet according to claim 1, and a coated or plated layer on at least one side thereof.

5. A method of producing the high strength steel sheet according to claim 1, the method comprising:
holding a steel slab having the chemical composition at a slab heating temperature of 1150° C. or more for 100 min or more;
hot rolling the steel slab under a set of conditions including a rough rolling finish temperature of 1050° C. or more and a finish rolling start temperature of 1000° C. or more, to obtain a hot-rolled sheet;
pickling the hot-rolled sheet;
cold rolling the hot-rolled sheet to a cumulative rolling reduction ratio of 20% or more and 75% or less, to obtain a cold-rolled sheet; and
annealing the cold-rolled sheet by heating the cold-rolled sheet to a heating temperature of 820° C. or more under a set of conditions including an average heating rate of 10° C./s or more in a temperature range from 250° C. or more to 700° C. or less and a time of 40 s or more from 750° C. to the heating temperature, then cooling to 150° C. or less at an average cooling rate of 1.0° C./s or more in a temperature range from 250° C. or more to 400° C. or less, to obtain the high strength steel sheet.

6. The method according to claim 5, wherein oxygen concentration of the atmosphere at the heating temperature is 2 volume ppm or more and 30 volume ppm or less and the dew point of the atmosphere is −35° C. or more.

7. A process of producing a high strength coated or plated steel sheet comprising the high strength steel sheet produced by the method according to claim 5, the process comprising after the annealing, coating or plating by applying a coating or plating treatment to at least one side of the high strength steel sheet to obtain the high strength coated or plated steel sheet.

8. A member comprising at least a portion of the high strength steel sheet according to claim 1.

9. A member comprising at least a portion of the high strength coated or plated steel sheet according to claim 4.

10. The member according to claim 8, wherein the member is for an automobile frame structural component or for an automobile reinforcing component.

11. The high strength steel sheet according to claim 2, the chemical composition further containing, in mass %, at least one element selected from the group consisting of:
O: 0.0100% or less,
V: 0.200% or less,
Ta: 0.10% or less,
W: 0.10% or less,
Cr: 1.00% or less,
Mo: 1.00% or less,
Ni: 1.00% or less,
Co: 0.010% or less,
Cu: 1.00% or less,
Sn: 0.200% or less,
Sb: 0.200% or less,
Ca: 0.0100% or less,
Mg: 0.0100% or less,
REM: 0.0100% or less,
Zr: 0.100% or less,
Te: 0.100% or less,
Hf: 0.10% or less, and
Bi: 0.200% or less.

12. A high strength coated or plated steel sheet comprising the high strength steel sheet according to claim 2, and a coated or plated layer on at least one side thereof.

13. A high strength coated or plated steel sheet comprising the high strength steel sheet according to claim 3, and a coated or plated layer on at least one side thereof.

14. A high strength coated or plated steel sheet comprising the high strength steel sheet according to claim 11, and a coated or plated layer on at least one side thereof.

15. A method of producing the high strength steel sheet according to claim 3, the method comprising:
holding a steel slab having the chemical composition at a slab heating temperature of 1150° C. or more for 100 min or more;
hot rolling the steel slab under a set of conditions including a rough rolling finish temperature of 1050° C. or more and a finish rolling start temperature of 1000° C. or more, to obtain a hot-rolled sheet;
pickling the hot-rolled sheet;
cold rolling the hot-rolled sheet to a cumulative rolling reduction ratio of 20% or more and 75% or less, to obtain a cold-rolled sheet; and
annealing the cold-rolled sheet by heating the cold-rolled sheet to a heating temperature of 820° C. or more under a set of conditions including an average heating rate of 10° C./s or more in a temperature range from 250° C. or more to 700° C. or less and a time of 40 s or more from 750° C. to the heating temperature, then cooling to 150° C. or less at an average cooling rate of 1.0° C./s or more in a temperature range from 250° C. or more to 400° C. or less, to obtain the high strength steel sheet.

16. The method according to claim 15, wherein oxygen concentration of the atmosphere at the heating temperature is 2 volume ppm or more and 30 volume ppm or less and the dew point of the atmosphere is −35° C. or more.

17. A process of producing a high strength coated or plated steel sheet comprising the high strength steel sheet produced by the method according to claim 15, the process comprising, after the annealing, coating or plating by applying a coating or plating treatment to at least one side of the high strength steel sheet to obtain the high strength coated or plated steel sheet.

18. A process of producing a high strength coated or plated steel sheet comprising the high strength steel sheet produced by the method according to claim 6, the process comprising, after the annealing, coating or plating by applying a coating or plating treatment to at least one side of the high strength steel sheet to obtain the high strength coated or plated steel sheet.

19. A member comprising at least a portion of the high strength steel sheet according to claim 2.

20. A member comprising at least a portion of the high strength steel sheet according to claim 3.

* * * * *